United States Patent
Okumura

(10) Patent No.: US 6,944,468 B2
(45) Date of Patent: Sep. 13, 2005

(54) TRANSMIT POWER CONTROL METHOD AND TRANSMIT POWER CONTROL SYSTEM SUITABLE TO MOBILE COMMUNICATIONS

(75) Inventor: Yukihiko Okumura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 399 days.

(21) Appl. No.: 10/183,452

(22) Filed: Jun. 28, 2002

(65) Prior Publication Data

US 2003/0003942 A1 Jan. 2, 2003

(30) Foreign Application Priority Data

Jun. 29, 2001 (JP) ........................................ 2001-199864

(51) Int. Cl.⁷ ................................................ H04B 7/00
(52) U.S. Cl. ........................ 455/522; 455/69; 455/574; 370/337
(58) Field of Search ................................ 455/574, 573, 455/572, 522, 69, 67.1, 70, 477; 370/337, 329, 335, 342

(56) References Cited

U.S. PATENT DOCUMENTS

| | | | |
|---|---|---|---|
| 6,223,040 B1 * | 4/2001 | Dam ........................... | 455/447 |
| 6,385,437 B1 * | 5/2002 | Park et al. ..................... | 455/69 |
| 6,526,261 B1 * | 2/2003 | Takeuchi et al. .............. | 455/69 |
| 6,748,232 B1 * | 6/2004 | Anderson et al. ........... | 455/522 |
| 2001/0023395 A1 * | 9/2001 | Su et al. ...................... | 704/220 |
| 2001/0040880 A1 * | 11/2001 | Chen et al. .................. | 370/337 |
| 2002/0068618 A1 * | 6/2002 | Shoobridge .................. | 455/574 |
| 2002/0160799 A1 * | 10/2002 | Kanemoto et al. .......... | 455/522 |
| 2003/0224836 A1 * | 12/2003 | Tsai et al. .................... | 455/573 |
| 2004/0141483 A1 * | 7/2004 | Zeira et al. .................. | 370/335 |

FOREIGN PATENT DOCUMENTS

| | | | |
|---|---|---|---|
| EP | 1 045 528 | 10/2000 | |
| EP | 1045528 A1 * | 10/2000 | ........... H04B/7/005 |
| EP | 1 079 541 | 2/2001 | |
| EP | 1 143 634 | 10/2001 | |
| JP | WO97/50197 | 12/1997 | |
| KR | 2000-0056180 | 9/2000 | |
| WO | WO 00/48335 | 8/2000 | |

* cited by examiner

Primary Examiner—Nick Corsaro
Assistant Examiner—Tan Trinh
(74) Attorney, Agent, or Firm—Oblon, Spivak, McClelland, Maier & Neustadt, P.C.

(57) ABSTRACT

A transmit power control method and system used in radio communications between a transmitting station and a receiving station is provided. The method and system employ a so-called double closed-loop control technique, and target signal quality is updated so that data quality received at the receiving station satisfies prescribed target data quality. When data are transmitted discontinuously, first target signal quality updated immediately before an idle period is held, and second target signal quality higher than the first target signal quality is set when data transmission resumes immediately after the idle period. The transmit power of the transmitting station is regulated so that signal quality at the receiving station satisfies the second target signal quality when the data transmission resumes.

20 Claims, 18 Drawing Sheets

TRANSMIT POWER CONTROL METHOD AND TRANSMIT POWER CONTROL SYSTEM SUITABLE TO MOBILE COMMUNICATIONS

BACKGROUND OF THE INVENTION

1. Field of the Invention

The present invention relates to a transmit power control method and system employing a so-called double closed-loop control, which is suitably used in radio communications between a transmitting station and a receiving station.

2. Description of Related Art

Conventionally, transmit power control techniques have been employed in mobile communications. For example, International Publication WO97/50197 discloses double closed-loop control for regulating the transmit power of a transmitting station (either the base station or a mobile terminal) during radio communications between the base station and the mobile terminal in a CDMA mobile communications system. Double closed-loop control consists of inner-loop control and outer-loop control. Under inner-loop control, the transmit power of the transmitting station is regulated so that the SIR (Signal to Interference plus noise power Ratio) measured at the receiving station approaches a target SIR. During this process, data quality (frame error rate (FER) or bit error rata (BER), for example) of the received information is monitored at the receiving station, and the target SIR itself is updated so that the received data quality approaches the target quality (that is, outer-loop control).

With this double closed-loop control, transmit power control is performed efficiently during continuous data transmission between the transmitting station and the receiving station, while the signal quality received at the receiving station is maintained at a desired level (or the target quality).

However, if discontinuous transmission is performed between the transmitting station and the receiving station (for example, in burst mode, packet transmission, or transmitting control signals), problems arise in the conventional double closed-loop control.

FIG. 1 shows an example of such problems, illustrating the relation between the discontinuous data transmission and the target SIR in the conventional transmit power control. In FIG. 1, data transmission from a transmitting station to a receiving station terminates at time $t_e$, and resumes at time $t_s$. During the idle period between data transmissions, the environment for radio wave propagation between the transmitting station and the receiving station is likely to change due to traveling of a mobile terminal (which may be the transmitting station or the receiving station). Such environmental change in radio communications includes, for example, fading and change in multi-path conditions between the transmitting station and the receiving station. Due to the change in radio wave propagation between the transmitting station and the receiving station during the idle period, the data receiving quality at time $t_s$, at which data transmission is resumed, may deteriorate as compared with the data receiving quality at time $t_e$, at which the previous transmission terminates.

Under this situation, if the target SIR at the end of the previous transmission (at time $t_e$) is maintained until the beginning of the next transmission (time $t_s$), that target SIR may be much lower than the correct target SIR (indicated by the dashed line in FIG. 1) that should be obtained based on the data receiving quality expected from the current environment of radio wave propagation in the idle period. For this reason, when the data transmission is resumed at $t_s$, it takes time for the target SIR to converge to the correct level obtained by the outer-loop control. During the time delay required for the convergence, the data receiving quality inevitably deteriorates.

SUMMARY OF THE INVENTION

Therefore, it is an object of the invention to provide a transmit power control method and system employing double closed-loop control, which is suitable for discontinuous transmission and capable of reducing deterioration of data receiving quality at the beginning of data transmission.

To achieve the object, in one aspect of the invention, a transmit power control method used in radio communications between a transmitting station and a receiving station is provided. This method employs a so-called double closed-loop control technique, and target signal quality is updated so that data quality received at the receiving station satisfies prescribed target data quality. When data is transmitted discontinuously, first target signal quality updated immediately before an idle period is held, and second target signal quality higher than the first target signal quality is set when data transmission resumes immediately after the idle period. Transmit power of the transmitting station is regulated so that signal quality at the receiving station satisfies the second target signal quality when the data transmission resumes.

With this method, when data transmission has resumed after the idle period, the transmit power of the transmitting station is regulated so that signal quality at the receiving station approaches a relatively high signal quality. Since data is transmitted from the transmitting station at a relatively higher transmit power when data transmission has resumed, deterioration of data quality immediately after the idle period can be efficiently prevented.

Signal quality can be expressed by, for example, a received signal level or a signal to interference plus noise power ratio (SIR), but is not limited to these examples.

Data quality can be expressed by, for example, a frame error rate (FER), a bit error rate (BER), moving average of FER or BER, or presence or absence of error per data transmission unit (such as frame), but is not limited to these examples. Any type of data quality can be used as long as it indicates the degree of consistency between the original data transmitted by the transmitting station and the received data at the receiving station.

The second target signal quality may be fixed at or near the upper limit of the acceptable range of target signal quality. Alternatively, it may be adjusted depending on the conditions, such as the radio-wave propagation environment between the transmitting station and the receiving station.

In the latter case, the radio-wave propagation environment changes depending on how long the idle period continues. In this case, the second target signal quality is adjusted in response to the length of the idle period. For example, the second target signal quality is set by adding a differential quantity corresponding to the length of the idle period to the first target signal quality.

The target signal quality may be adjusted without recognizing the idle period. In this case, pseudo data quality that is lower than the prescribed target data quality is produced during the idle period. The target signal quality during the idle period is updated based on the pseudo data quality.

In order to obtain the target signal quality more accurately, while applying the algorithm for obtaining the data quality as it is to the generation of pseudo data quality, the second target signal quality is set without taking the latest pseudo data quality into account when the data transmission resumes immediately after the idle period.

In order to prevent the data quality from becoming unnecessarily high and to achieve reasonable transmit power control, the second target signal quality is set so as not to exceed a predetermined upper limit.

The above-described method is applicable to multi-channel radio communications. In this case, the second target signal quality is set when data transmission resumes on at least one of multiple channels under a situation where all the channels have been in the idle period. The second target signal quality is updated so as to be higher than the first target signal quality of that channel.

The target signal quality is updated so that the data quality of each channel satisfies the corresponding target data quality assigned to that channel.

In another aspect of the invention, a transmit power control system used for radio communications between a transmitting station and a receiving station is provided. This system comprises a target signal quality determination unit for setting target signal quality so that data quality received at the receiving station satisfies a prescribed target data quality. The target signal quality determination unit holds first target signal quality updated immediately before an idle period when data are transmitted discontinuously, and it sets second target signal quality that is higher than the first target signal quality when data transmission resumes immediately after the idle period. The system also comprises a control signal generator that generates a transmit power control signal based on the target signal quality, and a transmit power controller that regulates the transmit power of the transmitting station based on the control signal so that signal quality of the receiving station satisfies the target signal quality.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENTS

The details of the preferred embodiments of the invention will now be described with reference to the attached drawings.

Figure 1:
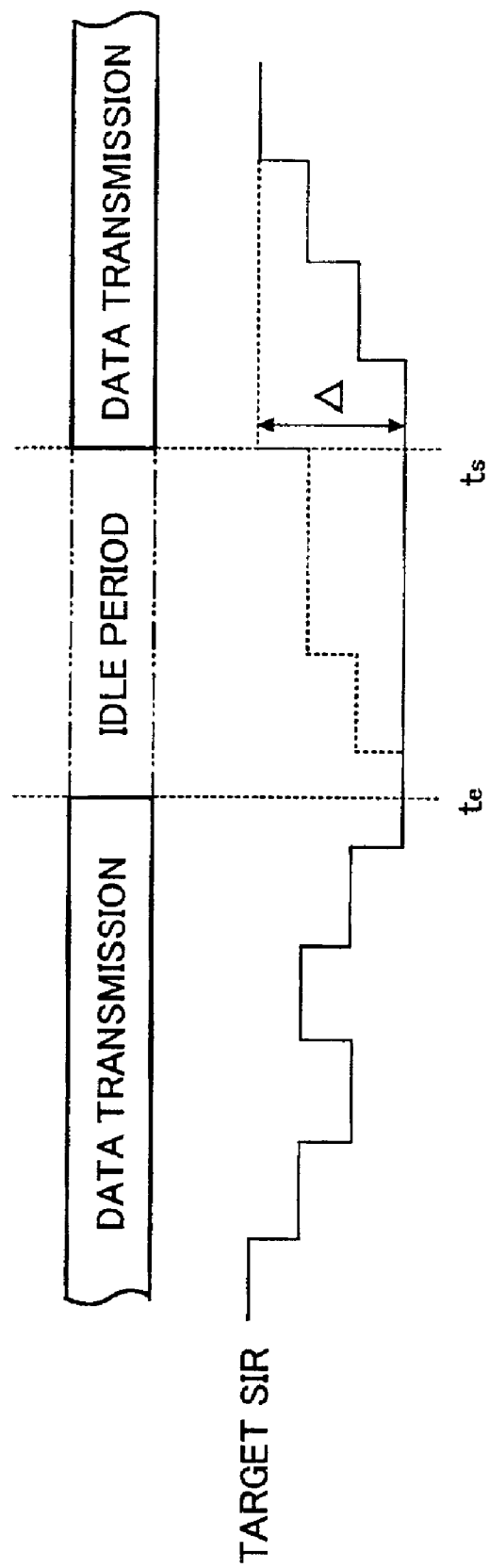
FIG. 1 illustrates a relation between data transmission timing and target SIR in the conventional transmit power control.
Figure 2:
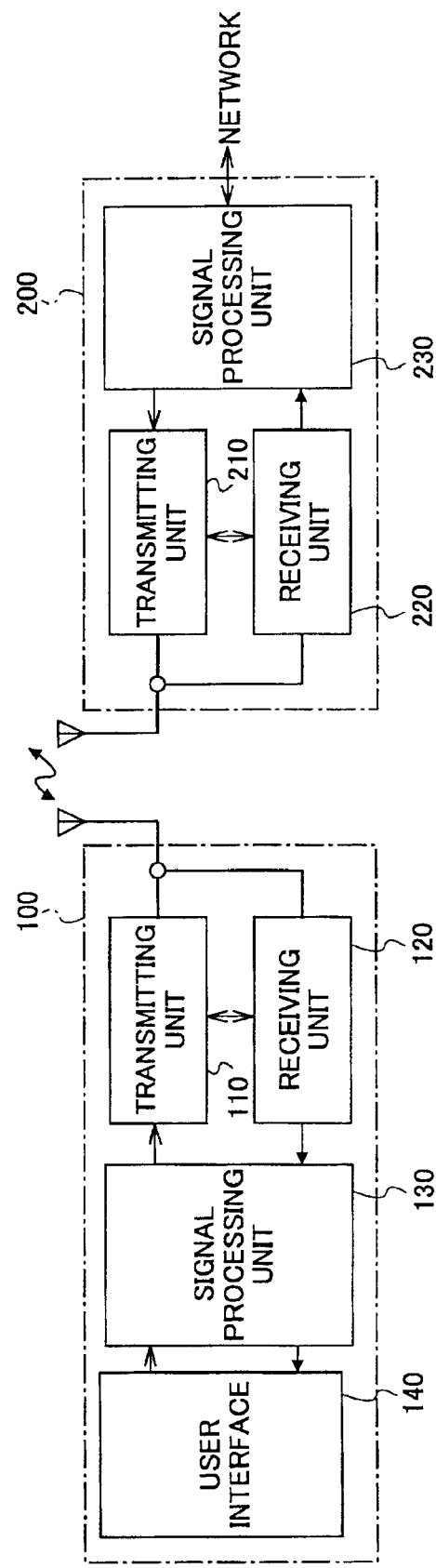
FIG. 2 illustrates an example of a radio communications system to which transmit power control of the present invention is applied.

FIG. 2 illustrates an example of a radio communications system to which transmit power control of the present invention is applied. The radio communications system illustrated in FIG. 2 is a mobile communications system that allows data to be transmitted between the mobile station 100 and the base station 200.

The mobile station 100 and the base station 200 transmit and receive data (including packets, control signals, and audio signals) in accordance with, for example, a CDMA scheme. The mobile station 100 has a transmitting unit 110, a receiving unit 120, a signal processing unit 130, and a user interface 140. The base station has a transmitting unit 210, a receiving unit 220, and a signal processing unit 230.

The signal processing unit 130 of the mobile station 100 processes and converts information (such as audio sound, text, images, etc.) input by the user through the user interface 140 into a predetermined format. The processed signal is supplied from the signal processing unit 130 to the transmitting unit 110, in which the signal is encoded and modulated. The modulated signal is then transmitted from the transmitting unit 110 to the base station 200.

The receiving unit 220 of the base station 200 receives the modulated signal from the mobile station. The receiving unit 220 demodulates and decodes the received signal. The signal processing unit 230 converts the signal supplied from the receiving unit 220 into an appropriate format so as to be capable of propagating in the network. The signal is transmitted from the signal processing unit 230 to the terminating terminal (or the destination terminal) via the network.

When receiving signals, the signal processing unit 230 of the base station 200 processes signals received from the network into a predetermined format. The processed signal is supplied to the transmitting unit 210 and subjected to encoding and modulation. The modulated signal is transmitted from the transmitting unit 210 to the mobile station 100.

The receiving unit 120 of the mobile station 100 receives the modulated signal from the base station 200, and applies decoding and demodulation to the received signal. The signal processing unit 130 converts the decoded and demodulated signal into an appropriate format so as to be treated by the user interface 140. The user interface 140 provides the information (such as audio sound, text, e-mail, images) to the user.

The transmitting unit 210 of the base station 200 carries out down-link transmit power control based on the transmit power control bit (indicating power up or power down) received from the mobile station 100. Similarly, the transmitting unit 110 of the mobile station 100 carries out up-link transmit power control based on the transmit power control bit received from the base station 200.

Figure 3:
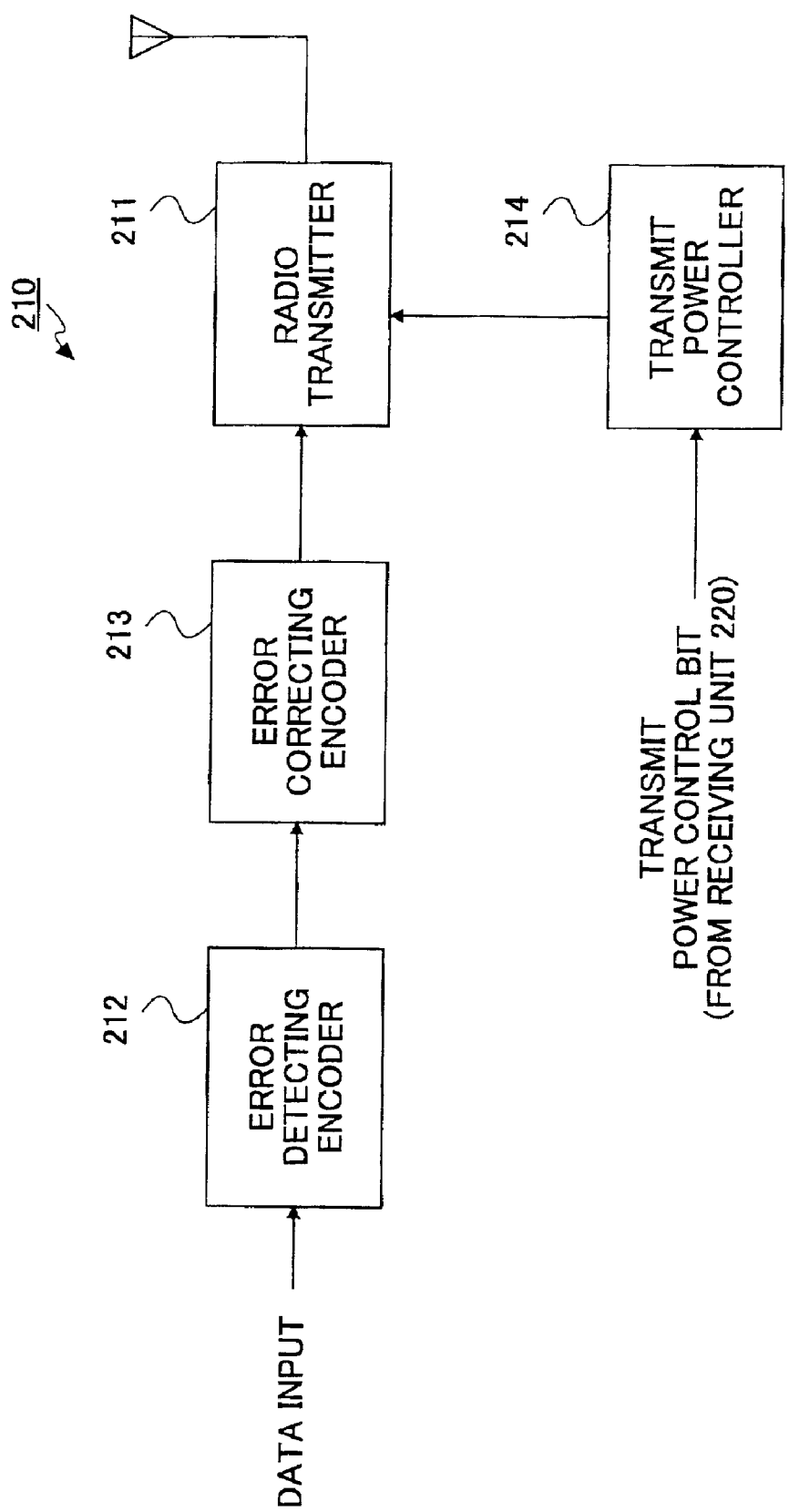
FIG. 3 is a block diagram illustrating the major part of the transmitting unit of a radio communication station shown in FIG. 2, which is involved in transmit power control.

FIG. 3 illustrates an example of the structure of the transmitting unit 210 of the base station 200, which cooperates with the receiving unit 120 of the mobile station 100 to constitute a transmit power control system. The transmitting unit 210 includes a radio transmitter 211, an error detecting encoder 212, an error correcting encoder 213, and a transmit power controller 214. Information that is to be transmitted to the destination (mobile station 100) is input from the signal processing unit 230 (FIG. 2) to the error detecting encoder 212. The error detecting encoder 212 encodes the data using, for example, CRC (cycle redundancy check), adds a parity bit for error detection to each frame, and outputs this signal to the error correcting encoder 213. The error correcting encoder 213 encodes each frame with a parity bit received from the error detecting encoder 212.

The radio transmitter 211 modulates the encoded data of each frame supplied from the error correcting encoder 213, and transmits the modulated signal. The transmit power controller 214 acquires the transmit power control bit, which is generated by the mobile station 100, from the receiving unit 220, as will be explained below. The transmit power controller 214 regulates the transmit power of the radio transmitter 211 based on the transmit power control bit. For example, if the transmit power control bit represents power up, the transmit power of the radio transmitter 211 is increased by a predetermined quantity (dB). If the transmit power control bit represents power down, then the transmit power is reduced by a predetermined quantity (dB).

Figure 4:
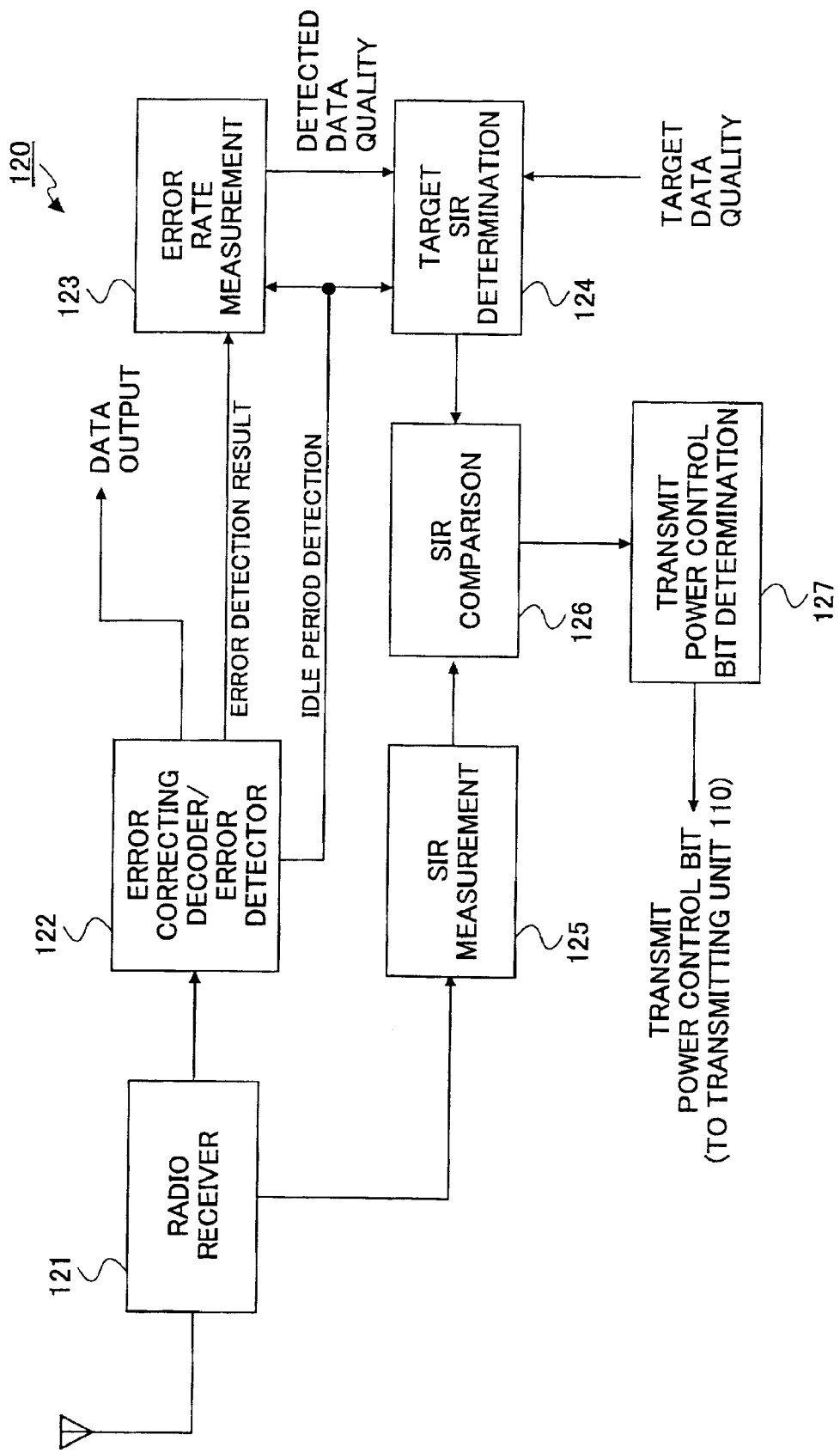
FIG. 4 is a block diagram illustrating the major part of the receiving unit of the radio communication station shown in FIG. 2, which is involved in transmit power control.

FIG. 4 illustrates an example of the structure of the receiving unit 120 of the mobile station 100. The receiving unit 120 includes a radio receiver 121, an error correcting decoder/error detector 122, an error rate measuring unit 123, a target SIR determination unit 124, an SIR measuring unit 125, an SIR comparator 126, and a transmit power control bit determination unit 127. The radio receiver 121 receives and demodulates a signal transmitted from the base station 200, and produces a base band signal. The base band signal is supplied to the error correcting decoder/error detector 122. The error correcting decoder/error detector 122 decodes the error correcting code of the base band signal frame by frame, and detects whether there is an error contained in the frame using a CRC technique. The decoding result is output from the receiving unit 120 to the signal processing unit 130 (see FIG. 2), as indicated by the arrow "data output" in FIG. 4. The error correcting decoder/error detector 122 also outputs an error detection result indicating presence or absence of error for each frame, as well as outputting an idle period detection signal indicating whether it is in an idle period in which information (data and signal) is not transmitted.

The error rate measuring unit 123 calculates a frame error rate (FER) based on the error detection result supplied from the error correcting decoder/error detector 122. The frame error rate (FER) represents the quality of the information decoded from the received signal (unobstructed or undelayed wave).

The SIR measuring unit 125 computes an SIR (signal to interference plus noise power ratio) from the received signal supplied from the radio receiver 121. The computation cycle for SIR is shorter than the data frame cycle. The target SIR determination unit 124 determines a target SIR so that the data quality (FER) of the received information obtained by the error rate measuring unit 123 approaches the target data quality. The determination process of target SIR will be explained in more detail below. The SIR comparator 126 compares the received SIR, which is supplied from the SIR measuring unit 125, with the target SIR, which is supplied from the target SIR determination unit 124, and outputs the comparison result.

The output of the SIR comparator 126 is connected to the input to the transmit power control bit determination unit 127, which determines the value of the transmit power control bit based on the comparison result. If the received SIR is smaller than the target SIR, the received signal level is low, and therefore, the transmit power control bit is set to a value ("1", for example) for increasing the transmit power. On the other hand, if the received SIR is greater than the target SIR, the received signal level is high, and therefore, the transmit power control bit is set to a value ("0", for example) for reducing the transmit power. The transmit power control bit generated by the control bit determination unit 127 is supplied to the transmitting unit 110, which then transmits the transmit power control bit to the base station 200. The transmitting unit 210 of the base station regulates the transmit power based on this transmit power control bit, as has been described above.

Figure 5:
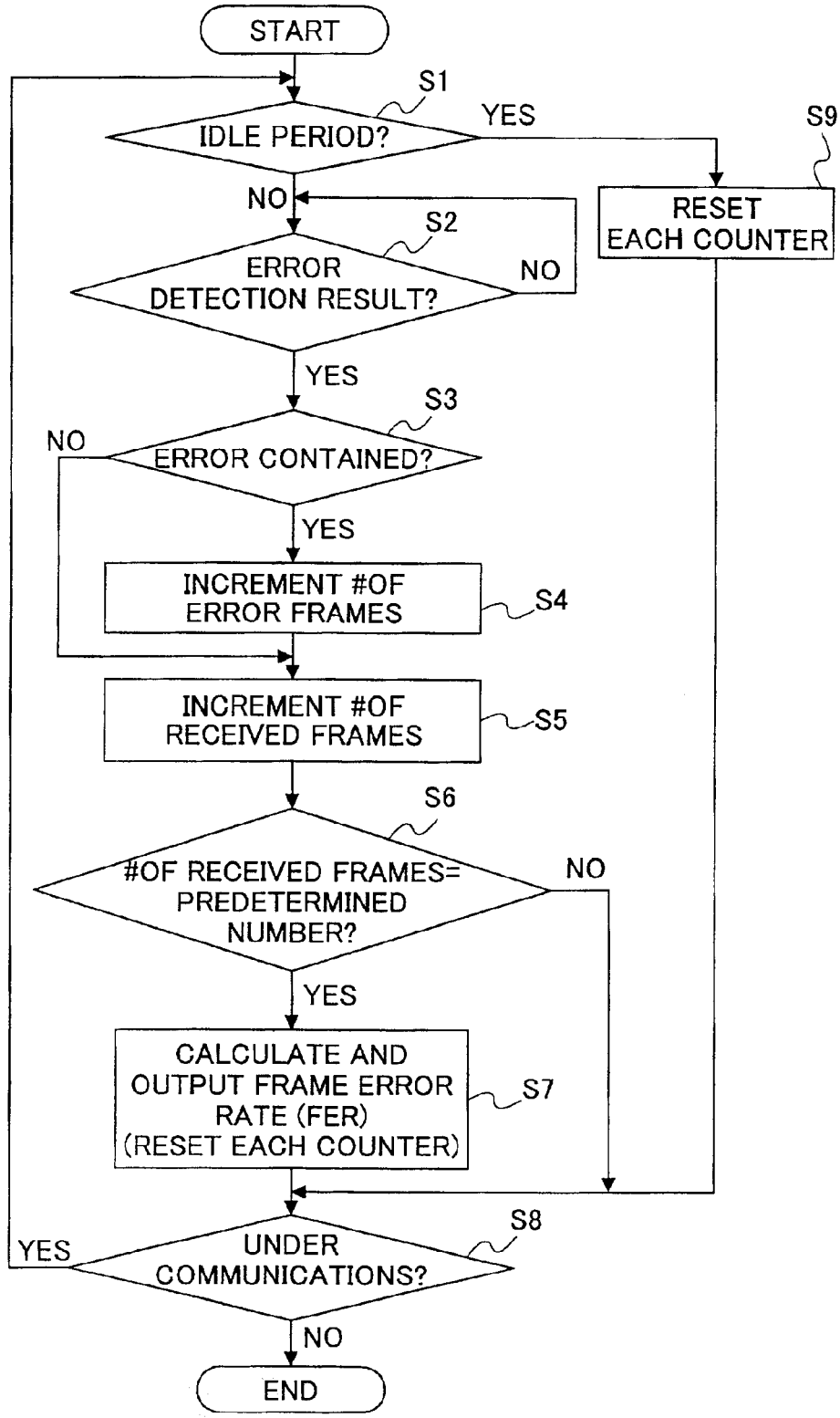
FIG. 5 illustrates a first example of operation flow of the error rate measuring unit shown in FIG. 4.

FIG. 5 is a flowchart of calculation of a frame error rate (FER) carried out by the error rate measuring unit 123. In operation, the error rate measuring unit 123 determines whether or not the current time belongs to an idle period based on an idle period detection signal (S1). If it is not in the idle period (NO in S1), then it is determined in step S2 if there is an error detection result input from the error correcting decoder/error detector 122. If there is no detection result (NO in S2), the error rate measuring unit 123 awaits an error detection result input from the error correcting decoder/error detector 122. If there is an error detection result (YES in S2), then it is determined if an error is contained (S3). The determination is carried out by, for example, checking if the CRC result is negative (CRC=NG), which means that an error has been detected. If there is an error (YES in S3), the counter increments the number of error frames by +1 (S4), and at the same time, the number of received frame is incremented by +1 (S5). On the other hand, if there is no error (CRC=OK) contained in the error detection result (NO in S3), then only the number of received frames is incremented (S5).

Then, it is determined if the number of received frames has reached a predetermined number (S6). If the number of received frames has not reached the predetermined number (NO in S6), it is confirmed if the data are being transmitted (S8), and if YES in S8, the above-described steps S1 through S6 are repeated. In this manner, during data transmission between the base station 200 and the mobile station 100 (that is, not in an idle period), every time the error detection result indicating the presence of error is input (YES in S2 and S3), both counters for the number of error frames and for the number of received frames are incremented (S4 and S5). If the error detection result indicates no error contained in the frame (NO in S3), only the counter for the number of received signal is incremented (S5).

If the number of received frames has reached the predetermined number (YES in S6) after repeating steps S1–S6 and S8, a frame error rate (FER=ratio of the number of error frames to the number of received frames) is calculated from the currently obtained received frames and the error frames (S7). The calculated EFR is output from the error rate measuring unit 123, and the error frame counter and the received frame counter are reset (S7). As long as data are being transmitted from the base station 200 to the mobile station 100 (NO in S1), the above-described operation process is executed repeatedly. Every time the number of received frame has reached the predetermined number, the error rate measuring unit 123 outputs an FER as a parameter indicating the quality of information restored from the received signal (unobstructed wave).

The predetermined number is selected based on the target data quality. For example, if the target quality (that is, the target FER) is $10^{-2}$, it is expected that an error frame appears every hundred (100) received frames or more. Accordingly, the predetermined number is set to one hundred (100) or greater.

During the above-described operation, if an idle period detection signal is input from the error correcting decoder/error detector 122 to the error rate measuring unit 123 (YES in S1), the error frame counter and the received frame counter are reset (S9). The idle period detection signal indicates that it is currently in an idle period in which there are no substantial data being transmitted or received. The counters are reset in the idle period in order to prevent an FER from being calculated from the remaining counter values when the data transmission is resumed after the idle period. By resetting the counters, a correct FER (data quality) of the received information can be obtained based on the current environment at the time data transmission is resumed, even if the radio-wave propagation environment has changed during the idle period.

The operation of the error rate measuring unit 123 shown in FIG. 5 terminates when the communication between the base station 200 and the mobile station 100 is over (NO in S8).

Figure 6:
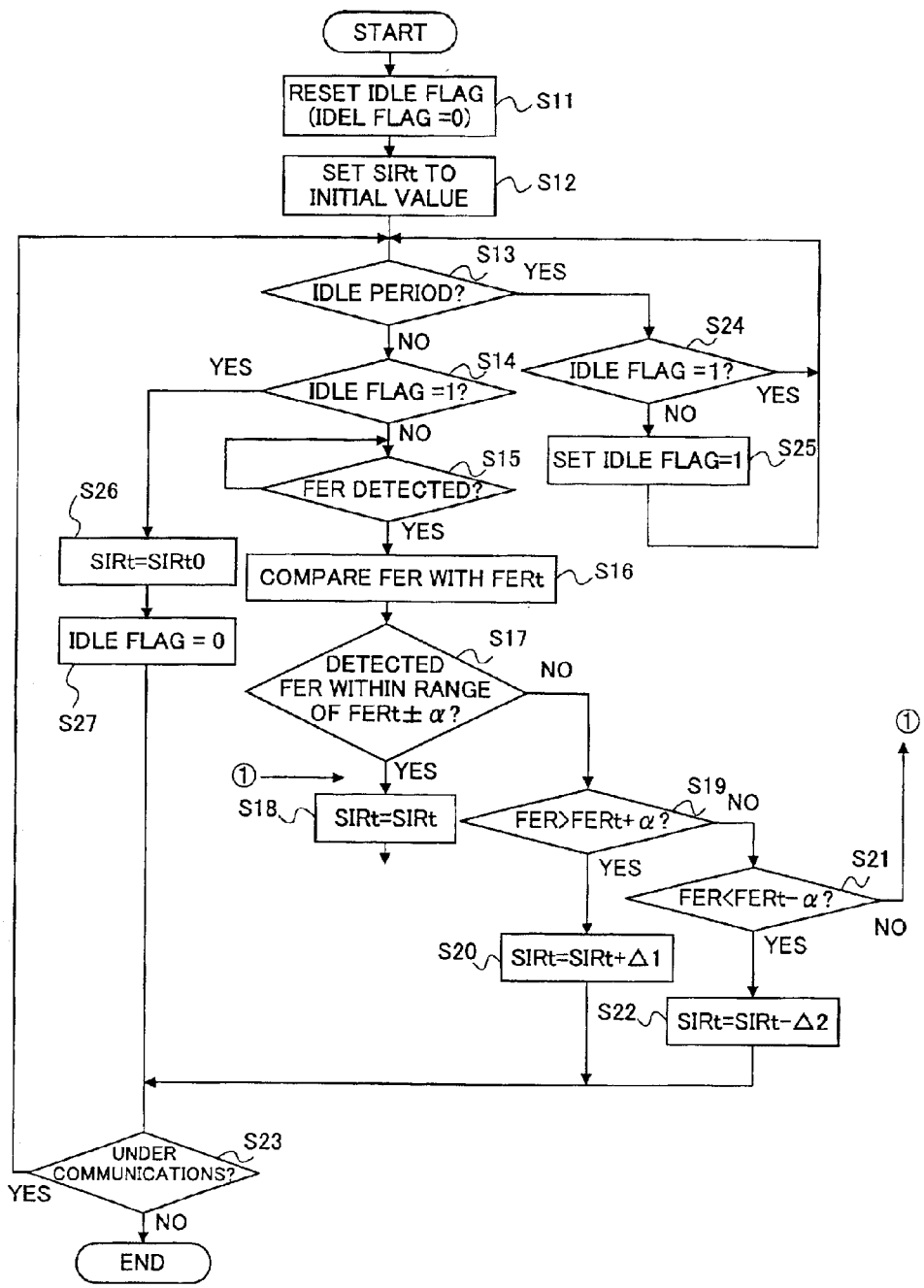
FIG. 6 illustrates a first example of operation flow of the target SIR determination unit shown in FIG. 4.

FIG. 6 illustrates an operation flow of the target SIR determination unit 124. The target SIR determination unit 124 resets the idle flag to zero (0) (S11), and sets the target SIR (SIRt) to the initial value (S12). Then, the target SIR determination unit 124 determines based on the idle period detection signal whether it is in an idle period (S13). If it is not in an idle period (which means that the data are being transmitted), the target SIR determination unit 124 further determines whether the idle flag is set to "1" (S14). If the idle flag is reset (idle flag=0) during the data transmission between the base station 200 and the mobile station 100 (NO in S13 and S14), the target SIR determination unit 124 awaits an FER, which is output from the error rate measuring unit 123 every predetermined number of received frames (NO in S15).

If an FER is input from the error rate measuring unit 123 (YES in S15), the input FER is compared with the target FER (FERt) indicating the target data quality (S16). Based on the comparison result, it is determined whether the input FER is within the rage of plus or minus α of the target FER (FERt±α) (S17). If the input FER is within the range FERt±α (YES in S17), the currently updated target SIR (SIRt) is maintained (SIRt=SIRt) (S18). On the other hand, the input FER is not within the range FERt±α (NO in S17), it is further determined if the input FER exceeds the upper limit (FERt+α) of the acceptable target error rate (S19).

If the input FER exceeds the upper limit (FERt+α) α) of the acceptable target error rate (YES in S19), the data quality of the received information does not reach the target data quality, and therefore, the target SIR (SIRt) is increased by Δ1 (SIRt=SIRt+Δ1) in step S20. On the other hand, if the input FER does not exceeds the upper limit (FERt+α) of the acceptable target error rate (NO in S19), it is further determined if the input FER is below the lower limit (FERt−α) of the acceptable target error rate (S21). If the input FER is below the lower limit (FERt−α) of the acceptable target error rate (YES in S21), the data quality of the received information reaches the target quality, and therefore, the target SIR (SIRt) is decreased by Δ2 (SIRt=SIRt−Δ2) in step S22.

If the input FER is not below the lower limit (FERt−α) of the acceptable target error rate (NO in S21), this determination result is inconsistent with the foregoing determinations (NO in S17 and S19). Therefore, the currently updated target SIR is maintained (SIRt=SIRt) in step S18.

Figure 7:
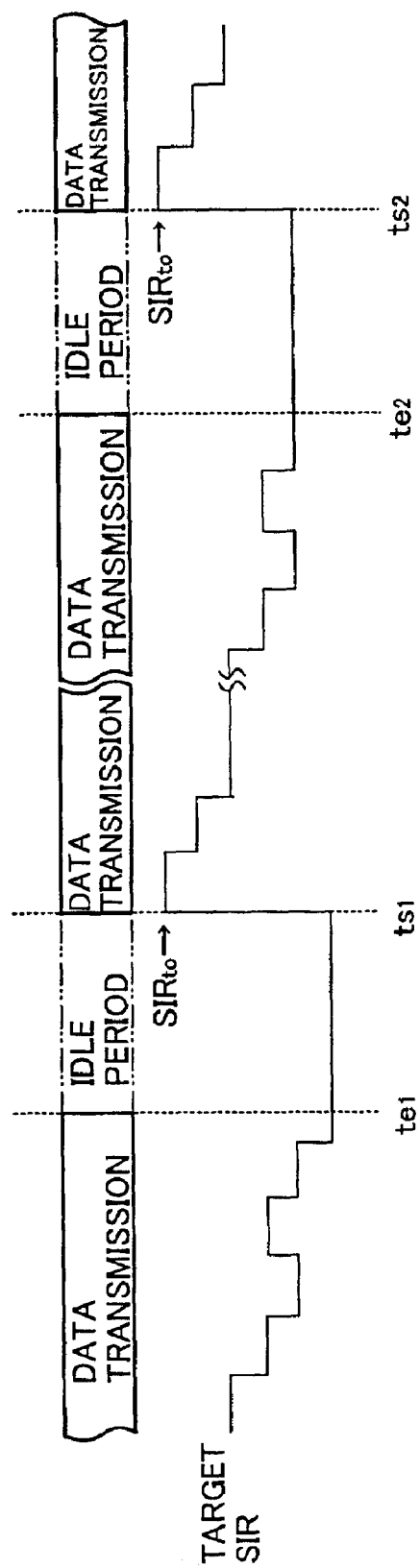
FIG. 7 illustrates a first example of the relation between data transmission timing and target SIR according to an embodiment of the invention.

In this manner, a new target SIR is determined every time an FER is input from the error rate measuring unit 123, based on the relative relation between the input FER and the target frame error rate (FERt). Consequently, during the period in which data are transmitted from the base station 200 to the mobile station 100 (i.e., the period except for idle periods, as illustrated in FIG. 7), the target SIR is increased by Δ1 if the data quality obtained from the received information is lower than the target quality (that is, if the input FER exceeds the upper limit of the acceptable range of the target error rate). If the obtained data quality is higher than the target quality (that is, if the input FER is below the lower limit of the acceptable range of the target error rate), the target SIR is decreased by Δ2. If the obtained data quality is similar to the target quality (that is, if the input FER is within the acceptable range ±α of the target error rate), the current target SIR is maintained.

Regulating the target SIR so that the measured data quality approaches the target quality is the outer loop control. Determining the transmit power control bit so that the SIR of the received signal approaches the target SIR is the inner loop control. With this double closed-loop control, the transmit power of the transmitting station (e.g., the transmitting unit of the base station) is efficiently regulated so that the data quality of the information received at the receiving station (e.g., the mobile station) approaches the target quality.

The unit Δ1 for increasing the target SIR may be equal to or different from the unit Δ2 for decreasing the target SIR. Setting Δ1 greater than Δ2 is preferable when the received data quality is lower than the target quality because transmit power control is carried out so that the received data can promptly converge to the target quality.

The foregoing operation is directed to the process during data transmission between the base station 200 and the mobile station 100. Then, if the data transmission from the base station 200 to the mobile station 100 pauses and an idle period ensues, the target SIR determination unit 124 determines in step S13 that it is in an idle period based on an idle period detection signal (YES in S13). In this case, the process proceeds to step S14 to determine whether the idle flag is set to "1". If the idle flag is not set (NO in S24), the idle flag is set to "1" (S25). The confirmation whether the idle flag is set to "1" is repeated until the data transmission starts again (S13 and S24).

If data transmission from the base station 200 resumes, the target SIR determination unit 124 again determines based on the idle period detection signal that it is not in the idle period (NO in S13), and checks if the idle flag is set to "1" (S14). At the beginning of the data transmission immediately after the idle period (that is, at time $t_{s1}$ and $t_{s2}$ shown in FIG. 7), the state of the idle flag is maintained at "1", as has been set at the beginning of the idle period (i.e., at $t_{e1}$ and $t_{e2}$). Accordingly, the determination result in step S14 indicates that the idle flag is set to "1" (YES in S14). In this case, the process proceeds to step S26, and the target SIR is set to a predetermined vale SIRto (SITt=SITto). Then, the idle flag is reset to "0" (S27). Subsequently, the steps S13 through S22 are repeated as long as data are transmitted from the base station 200 to the mobile station 100 to determine an appropriate target SIR based on the relative relation between the measured FER and the target frame error rate (FERt).

FIG. 7 illustrates a first example of a relation between target SIR and data transmission state. In the example shown in FIG. 7, the target SIRto set at $t_{s1}$ and $t_{s2}$ (i.e., at the beginning of the data transmission period immediately after the idle period) is chosen so as to be at or near the upper limit of the acceptable range of the target SIR. Consequently, transmit power is regulated so that the measured SIR of the received signal approaches the relatively high target SIRto in a certain period beginning from $t_{s1}$ and $t_{s2}$. As a result, the data quality obtained at the mobile station 100 can be maintained high (which means that the frame error rate of the received signal is maintained small) even if the radio-wave propagation environment has changed during the idle period.

Of course, SIRto set at the beginning of the data transmission is not limited to the upper limit or its vicinity of the acceptable range of the target SIR. For example, a predetermined quantity may be added to the target SIR updated at $t_{e1}$ and $t_{e2}$ (which is at the end of the previous data transmission period, or the beginning of the idle period) when the data transmission resumes at $t_{s1}$ and $t_{s2}$. In this case, the updated SIRto may be slightly lower than the appropriate target SIR expected from the current radio-wave propagation environment between the base station 200 and the mobile station 100 depending on the situation. However, the newly set SIRto can converge much rapidly to the appropriate target SIR, following steps S13 through S22, as compared with the conventional technique for resuming regulation of the target SIR from the latest target SIR obtained at the end of the previous data transmission period (or the beginning of the idle period).

The operation for setting the target SIR (S13–S27 is carried out repeatedly depending on the situation as long as communications continues between the mobile station 100 and the base station 200 (YES in S23). When communications between the mobile station 100 and the base station 200 terminates (NO in S23), the process also terminates.

Figure 8:
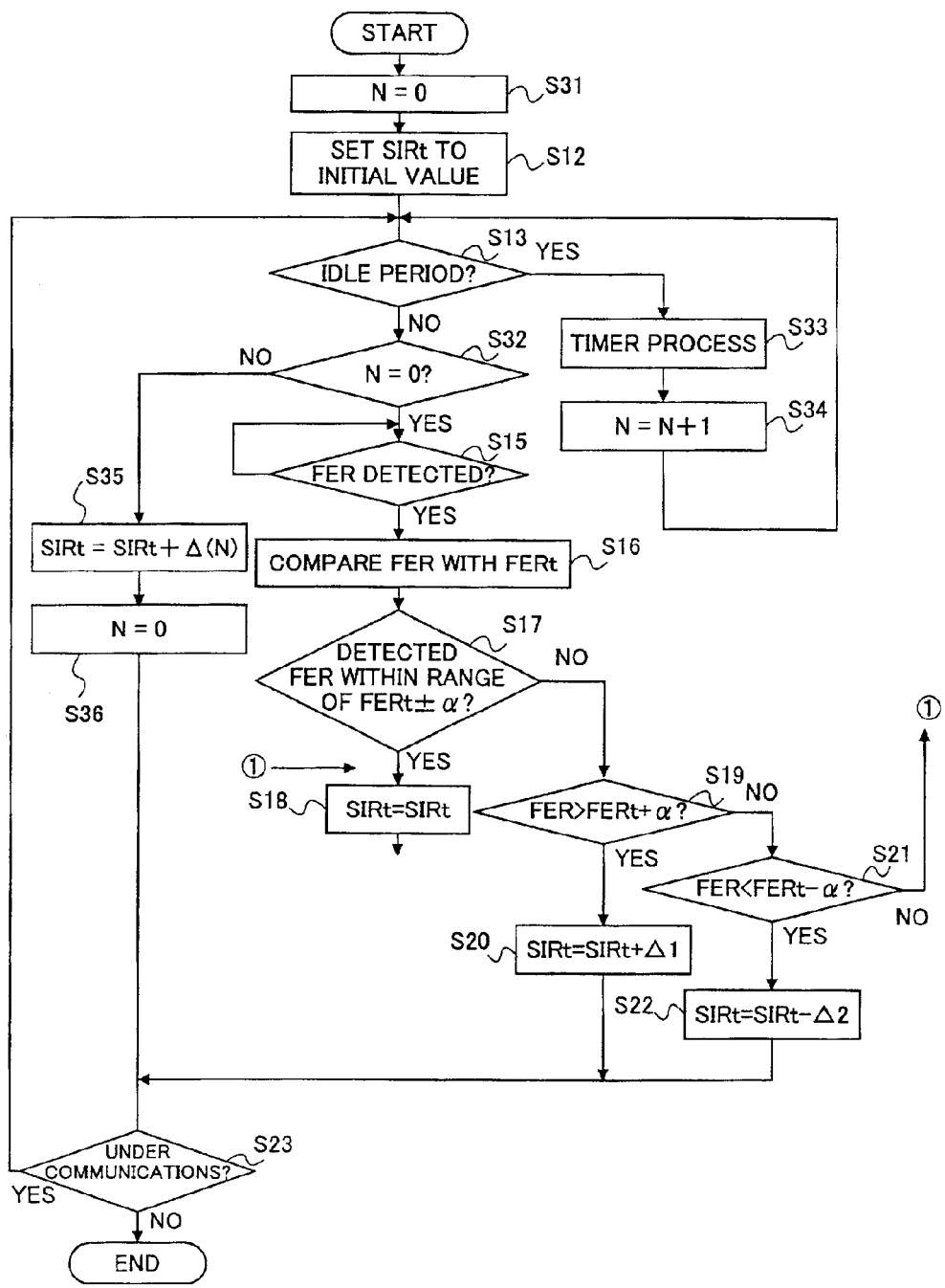
FIG. 8 illustrates a second example of operation flow of the target SIR determination unit shown in FIG. 4.

FIG. 8 illustrates a second example of operation flow carried out by the target SIR determination unit 124. In this example, the level of SIRto updated at the beginning of the data transmission immediately after the idle period is adjusted in accordance with the length of the idle period. In FIG. 8, the same numerical symbols denote the same steps as those shown in FIG. 6.

In operation, the counter value N is set to the initial value "0" (N=0), and the target SIR (SIRt) is set to the initial value (S31 and S12). Then, the target SIR determination unit 124 determines based on the idle period detection signal whether it is in an idle period (S13). If not in an idle period (that is, it is in a data transmission period), then it is determined whether the counter value N is zero (S32). If the counter value N is zero in the data transmission period (NO in S13 and YES in S32), then, the target SIR determination unit 124 determines an appropriate target SIR based on the relative relation between the input (measured) FER and the target error rate FERt (S15–S22) every time it receives a measured FER input from the error rate measuring unit 123, as in the example shown in FIG. 6.

When the data transmission from the base station 200 pauses and the idle period resumes during the above-described operation, the target SIR determination unit 124 determines based on the idle period detection signal that it is in the idle period (YES in S13). Then, timer process for timing a predetermined time is started (S33), and the counter value N is incremented by +1 when the time is up (S34). The timing (S33) and the increment (S34) are repeated during the idle period (YES in S13), and the counter value N is incremented one by one every predetermined time interval.

When the data transmission from the base station starts again, the target SIR determination unit 124 determines based on the idle period detection signal that it is not in the idle period (NO in S13). Then, it is further determined whether the counter value N is zero (S32). Immediately after the idle period, the counter indicates a value corresponding to the length of the idle period because the counter value N has been incremented every predetermined time. Therefore, the determination result in S32 becomes negative (NO in S32).

Then, the process proceeds to step S35, and a new target SIR is obtained by adding a difference $\Delta(N)$ that corresponds to the current counter value N to the latest target SIR maintained during the idle period (SIRt=SIRt+$\Delta(N)$), with reference to a table defining a relation between counter value N and difference $\Delta(N)$. Then, the counter value N is reset to zero (S36). After resetting the counter, the above-described steps S15 through S22 are repeated to determine an update target SIR, based on the relative relation between the measured FER and the target error rate FERt, as long as data are transmitted from the base station 200.

Figure 9:
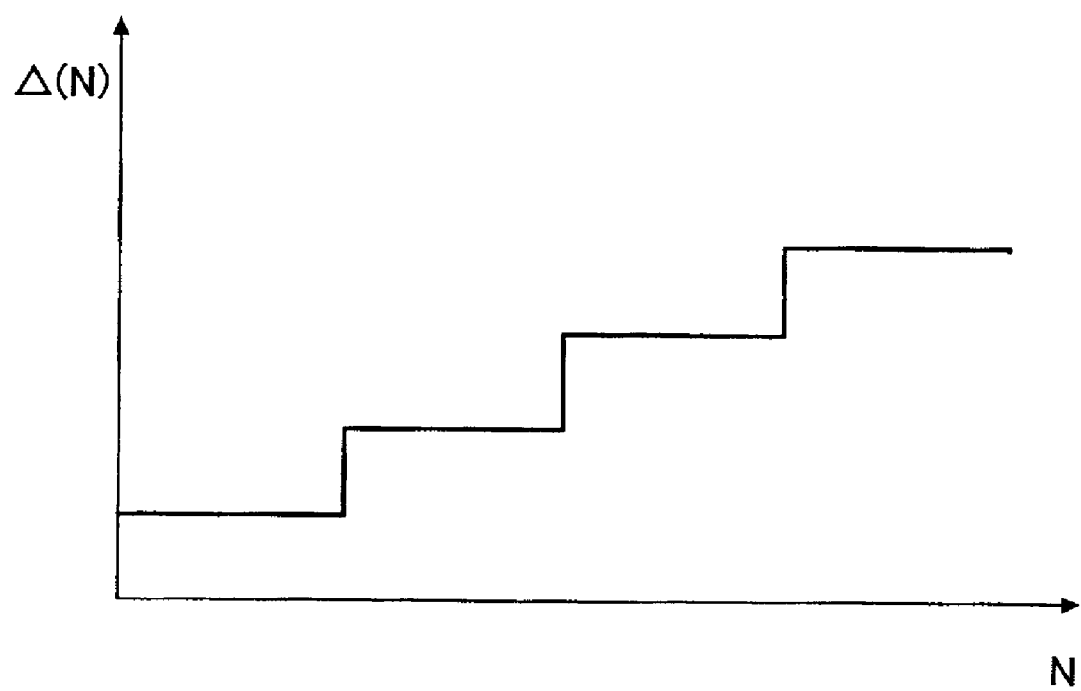
FIG. 9 illustrates a relation between the counter value N and the difference Δ(N) between the counter value and target SIR.
Figure 10:
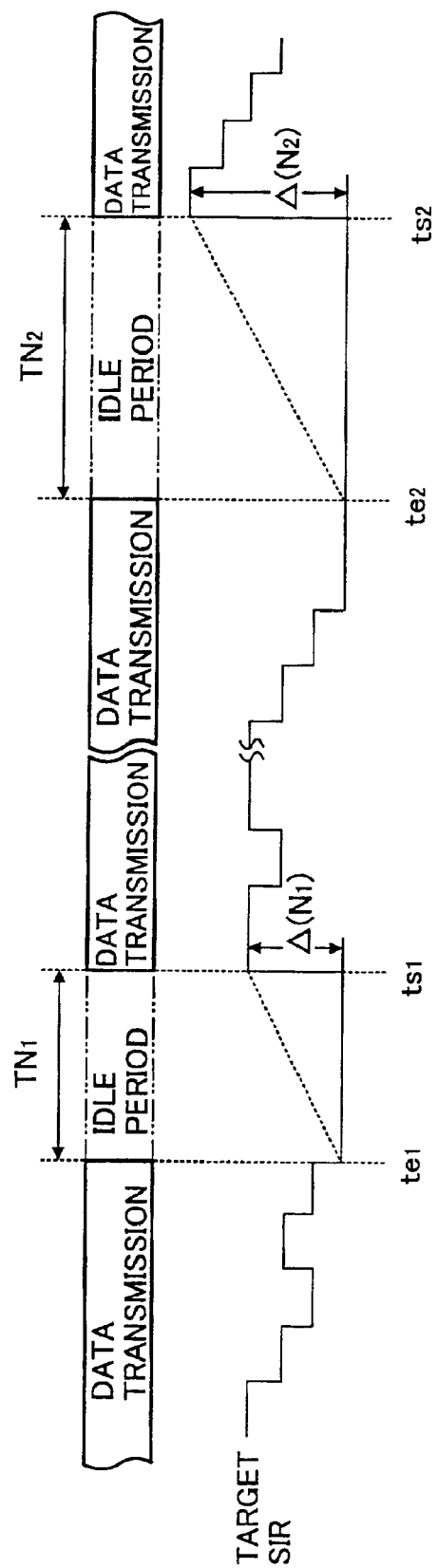
FIG. 10 illustrates a second example of relation between data transmission timing and target SIR.

FIG. 9 illustrates an example of relation between counter value N and difference $\Delta(N)$ defined in the table. In the example shown in FIG. 9, as the counter value N increases, the difference $\Delta(N)$ increases stepwise. FIG. 10 illustrates a second example of relation between the target SIR and data transmission state. Using the table shown in FIG. 9, difference $\Delta(N2)$ added at time $t_{s2}$ after a longer idle period $T_{N2}$ is greater than difference $\Delta(N1)$ added at $t_{s1}$ after a shorter idle period $T_{N1}$. In this manner, how much difference is added to the latest target SIR obtained at the end of the previous data transmission (at $t_{e1}$ or $t_{e2}$) is determined based on the length of the most recent idle period.

It is generally expected that, after a relatively long idle time $T_{N2}$, change in the radio-wave propagation environment is relatively large. Therefore, a relatively large target SIR is set at time $t_{s2}$ after the idle period $T_{N2}$, and transmit power is regulated for a certain time period beginning from $t_{s2}$ so that the received SIR approaches the relatively large target SIR. This arrangement allows the data quality obtained at the mobile station 100 to be maintained relatively high, with a relatively small error rate.

Similarly, change in the radio-wave propagation environment is likely to be small after a relatively short idle period $T_{N1}$, and therefore, increase in the target SIR at time $t_{s1}$ is expected to be relatively small. By setting a smaller difference $\Delta(N)$, the target SIR is updated to an appropriate level, preventing the situation where the target SIR is set unnecessarily high. Consequently, transmit power is regulated so that data quality obtained at the mobile station 100 becomes uniform without using excessive transmit power (and therefore without causing localized excessive quality).

Figure 11:
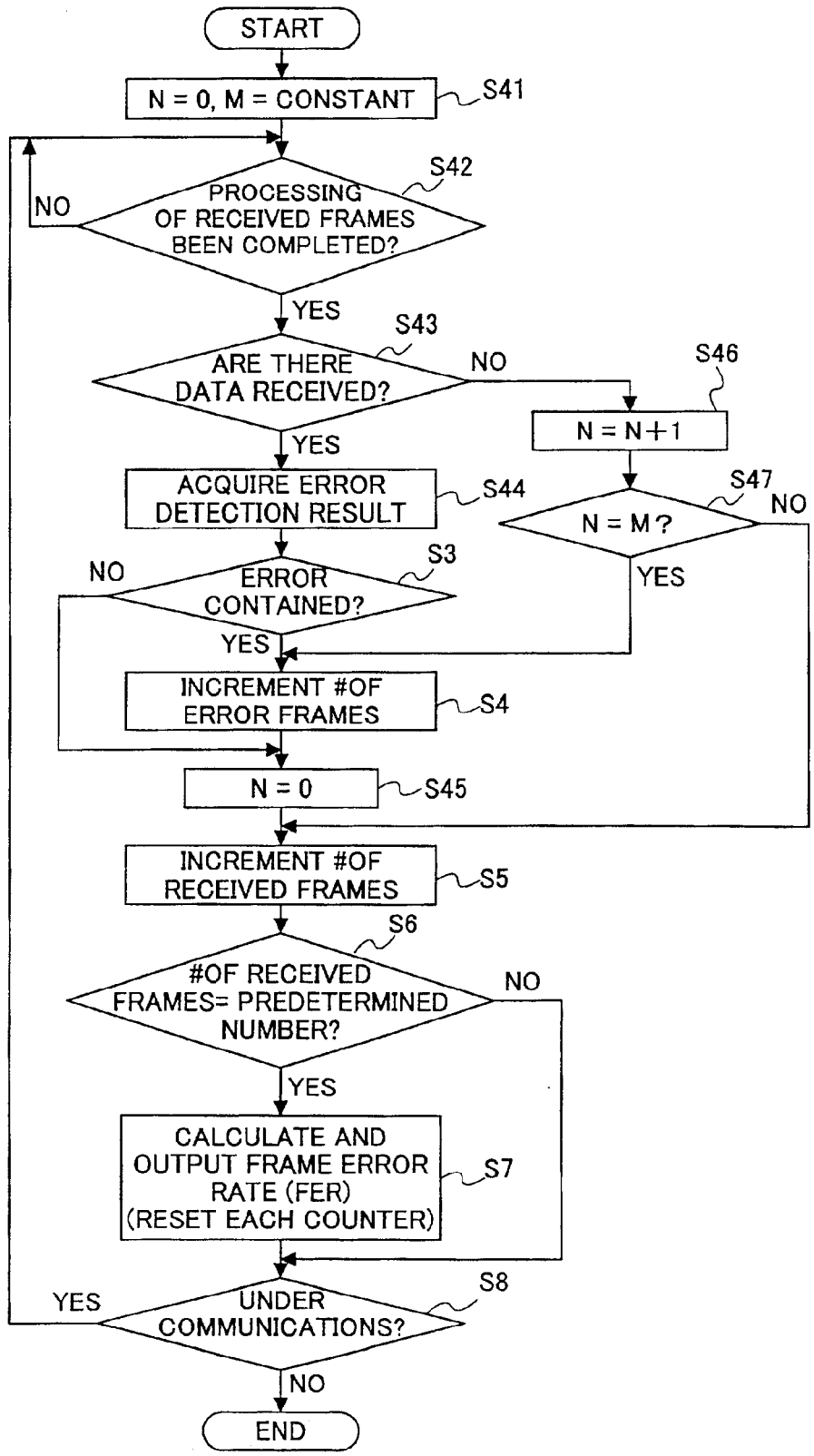
FIG. 11 illustrates a second example of operation flow of the error rate measuring unit shown in FIG. 4.

FIG. 11 illustrates a second example of operation flow carried out by the error rate measuring unit 123. In this example, a pseudo-FER is generated by the error rate measuring unit 123 during the idle period. Such pseudo-FER allows the target SIR determination unit 124 to set a relatively large target SIR, without monitoring the idle period, when data transmission resumes immediately after the idle period. In FIG. 11, the same numerical symbols denote the same steps as those shown in FIG. 5.

In operation, the error rate measuring unit 123 sets the counter value N to zero (i.e., the initial value), and selects a constant M (S41). The error rate measuring unit 123 checks whether the error correcting decoder/error detector 122 has completed processing (including decoding and error detection) of received frames (S42). If the signal processing of the received frames has been completed by the error correcting decoder/error detector 122 (YES in S42), then it is determined whether there are data received at the mobile station based on the idle period detection signal (S43). If there are received data, which means that is it is not in the idle period (YES in S43), then the error rate measuring unit 123 acquires the error detection result from the error correcting decoder/error detector 122 (S44).

Then, every time the acquired error detection result indicates the presence of error (YES in S3), the error frame counter and the received frame counter are incremented (S4 and S5), as in the first example of FIG. 5. If the detection result indicates that no error is contained in the frame (NO in S3), then only the error frame counter is incremented (S5). Every time error frame counter is incremented, the above-mentioned counter value N is reset (S45).

During data transmission from the base station 200 to the mobile station 100 (YES in S43), the error rate measuring unit 123 acquires an error detection result every time completion of the received frame processing has been confirmed (S42–S44). Based on the detection result, incrementing the error frame counter and the received frame counter, while resetting the counter value N, are repeated (S3, S4, S45, and S5). When the number of received frames has reached a predetermined value (YES in S6), a frame error rate (FER) is calculated based on the current number of received frames and the number of error frames, and the calculated EFR is output (S7), as in FIG. 5. Then, the respective counters are reset.

In this manner, the error rate measuring unit 123 supplies an EFR to the target SIR determination unit 124 every time the number of received frames reaches the predetermined value as long as data is being transmitted from the base station 200 to the mobile station 100.

When the current data transmission period terminates, it is determined based on the idle period detection signal that it is in the idle period without any data received from the base station (NO in S43). Then the counter value N is incremented by +1 (S46), and it is determined if the counter value N has reached the constant M (S47). The constant M is used in order to produce a pseudo-FER, and is set smaller than the above-described "predetermined value" used in determination step S6. If the counter value N has not reaches the constant M (NO in S47), the number of received frames is simply incremented (S5). As long as the idle period continues (NO in S43), incrementing of counter value N (S46), comparison of N with M (S47), incrementing of the received frame counter (S5), and comparison of the number of received frames with the predetermined value (S6) are repeated every time signal processing of the received frame has been completed (YES in S42).

During this process, if the counter value N has reaches the constant M (YES in S47), then the error frame counter is incremented (S4), and the counter value N is reset to zero (S45). Every time the number of received frames reaches the constant M, the error frame counter is incremented. Then, if the number of received frames has reached the predetermined value (YES in S6), a pseudo-FER is calculated, based on the number of received frames and the number of error frames (S7).

During the idle period, the error rate measuring unit 123 repeats the above-described steps S42, S43, S46, S47, S4, S45, S5, S6 and S7, and produces a pseudo-FER every M time frames. This pseudo-FER corresponds to a ratio of a single error frame to M received frames. The constant M is selected so that the pseudo-FER becomes larger than the upper limit (FERt+α) of the acceptable target error rate used to determine a target SIR.

In this example, the target SIR determination unit 124 receives an FER, which is output from the error rate measuring unit 123 based on the actual number of error frames during the data transmission from the base station 200 to the mobile station 100, and a pseudo-FER, which is output from the error rate measuring unit 123 during the idle period.

Figure 12:
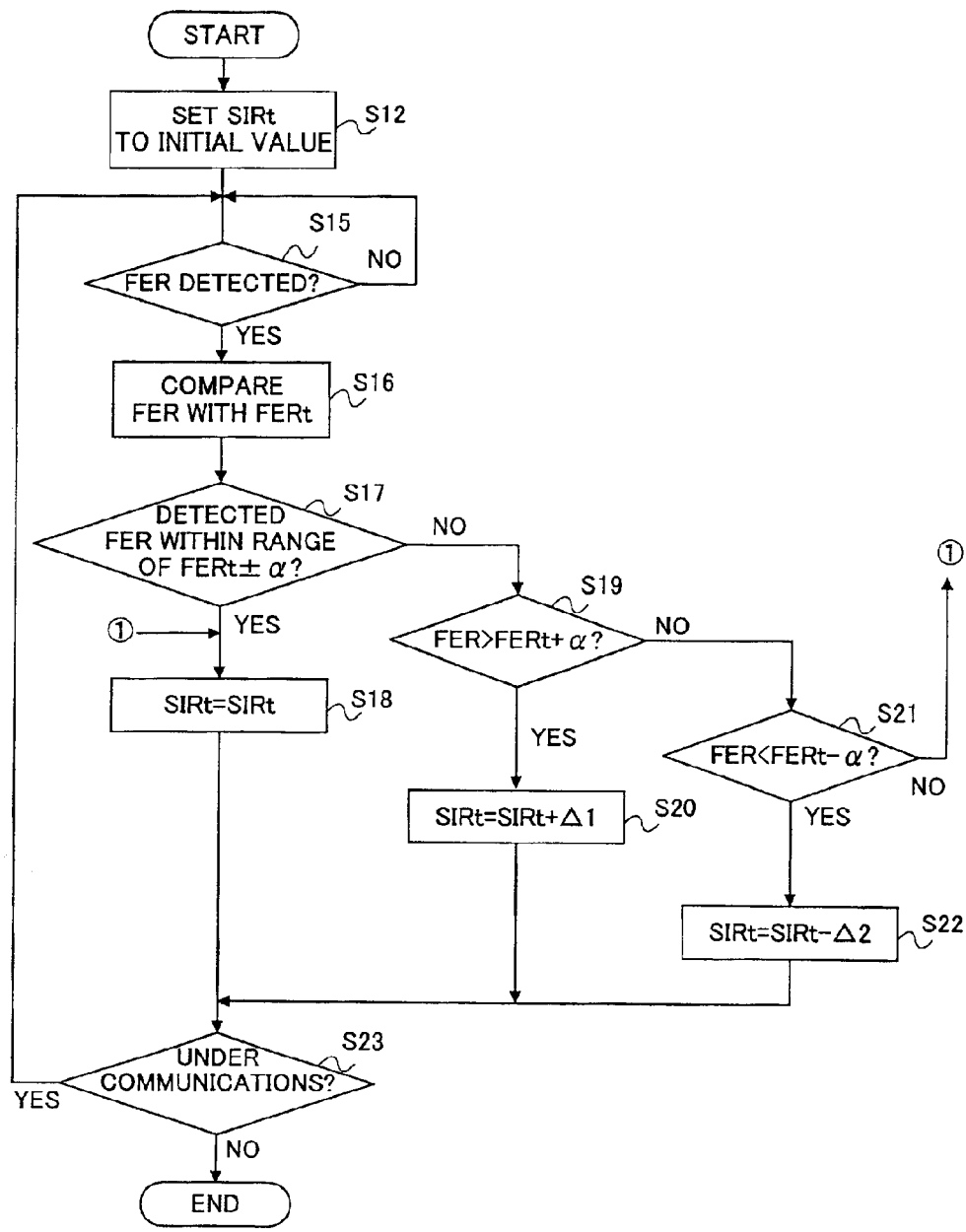
FIG. 12 illustrates a third example of operation flow of the target SIR determination unit shown in FIG. 4.

FIG. 12 illustrates a third example of operation flow of the target SIR determination unit 124 configured to cope with the pseudo-FER input from the error rate measuring unit 123. The same numerical symbols denote the same steps as those shown in FIG. 6 (i.e., the first example of operation flow of the target SIR determination unit 124).

As in FIG. 6, after the target SIR is set to the initial value (S12), a target SIR is determines based on the relative relation between a measured FER and a target frame error rate (FERt) every time the measured FER is input from the error rate measuring unit 123.

During the idle period, a pseudo-FER is output from the error rate measuring unit 123, as has been explained above in conjunction with FIG. 11. In this case, the pseudo-FER exceeds the upper limit of the acceptable target FER because the constant M is selected so that the pseudo-FER is greater than FERt+α in S41 of FIG. 11. Accordingly, every time pseudo-FER is input to the target SIR determination unit 124, the target SIR is increased by Δ1 (S15, S16, S19, and S20).

With this arrangement, the target SIR is increase by Δ1 every time the pseudo-FER is input during the idle period. Consequently, the difference between the target SIR at the beginning of the idle period and that at the end of the idle period becomes larger as the idle period is longer, as in the previous example explained in conjunction with FIGS. 8, 9, and 10.

Figure 13:
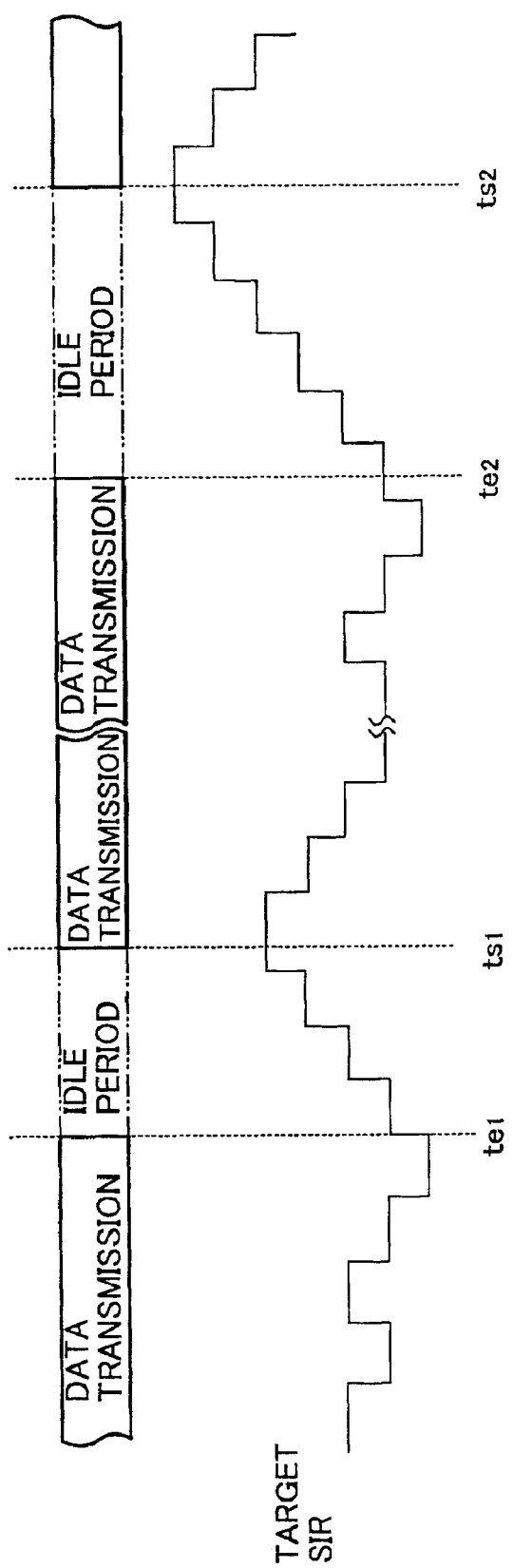
FIG. 13 illustrates a third example of relation between data transmission timing and target SIR.

FIG. 13 illustrates the relation between the target SIR and the data transmission state. As has been described above, it is expected that the longer the idle period, the greater a change in radio-wave propagation environment. Accordingly, a relatively large SIR is set immediately after a relatively long idle period, and transmit power is regulated for a certain period of time from the beginning of data transmission, so that the received SIR approaches the relatively large target SIR. On the other hand, it is expected that the change in radio-wave propagation environment is not significant if the idle period is short, and accordingly, the increase in the target SIR is not so large. This arrangement can guarantee a sufficiently high target SIR after a long idle period, while preventing the target SIR from being set unnecessarily high after a short idle time.

In this example using pseudo-FER (shown in FIGS. 11, 12 and 13), the target SIR determination unit 124 does not have to recognize idle periods. Consequently, the operation flow for determining a target SIR becomes simpler.

Figure 14:
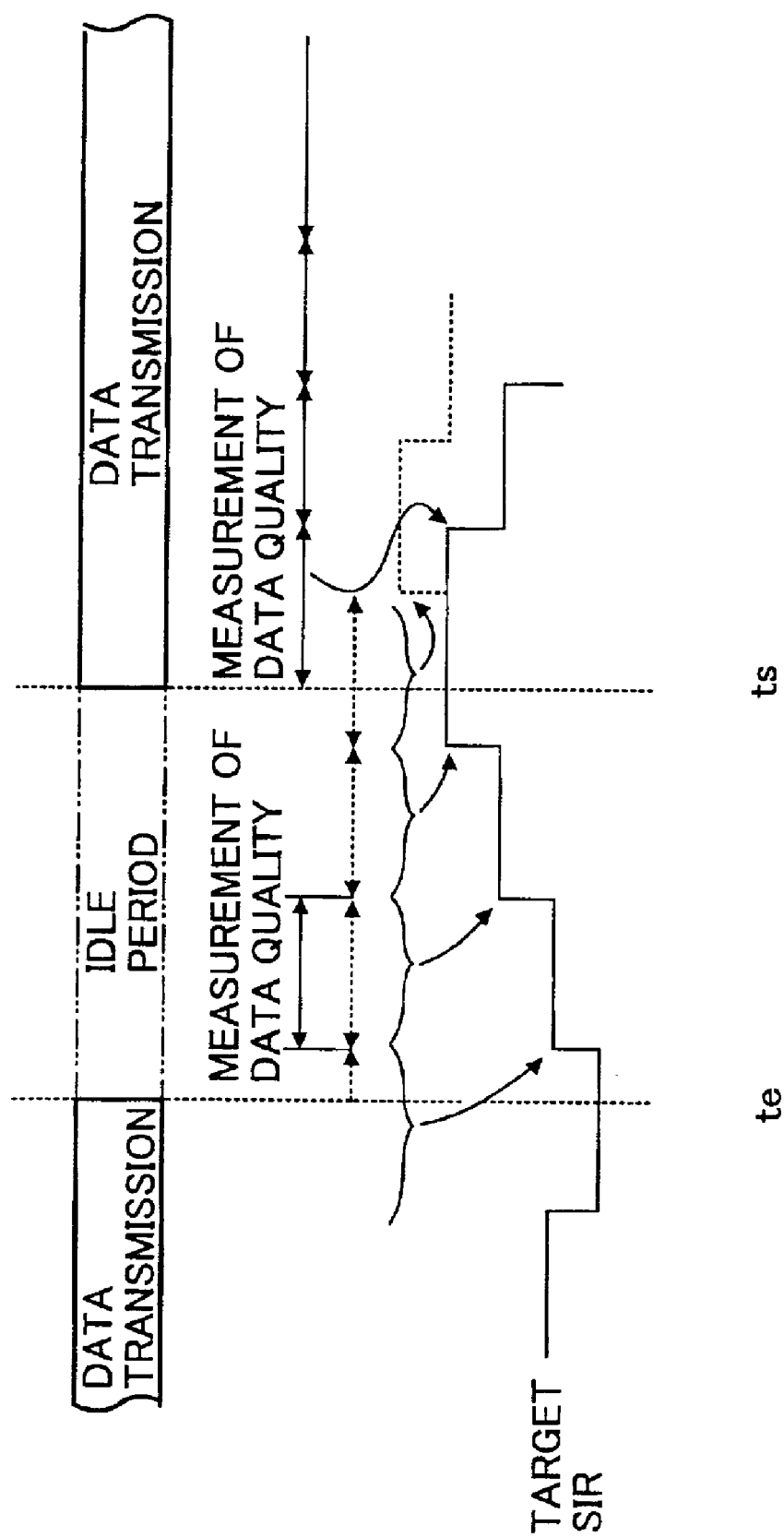
FIG. 14 illustrates a relation between data transmission timing and target SIR in which data quality measured in the quality measurement period is reflected.

FIG. 14 illustrates still another example in which data quality information is reflected to the target SIR. When calculating an FER in accordance with the operation flow shown in FIG. 11, a pseudo-FER is calculated every predetermined number of time frames corresponding to the data-quality measuring period (indicated by the bidirectional arrow) during the idle period. The calculated FER is reflected to the target SIR at the rising edge of the steps shown in FIG. 14. If data transmission starts again halfway through the data-quality measuring period, the number of pseudo-error frames counted so far is added to the actual error rate calculated from actually received data immediately after time ts (at the beginning of data transmission period). In this case, an unnecessarily high target SIR may be set as indicated in the dashed step. This may cause the accuracy of FER to deteriorate immediately after ts (starting time of a data transmission period).

Figure 15:
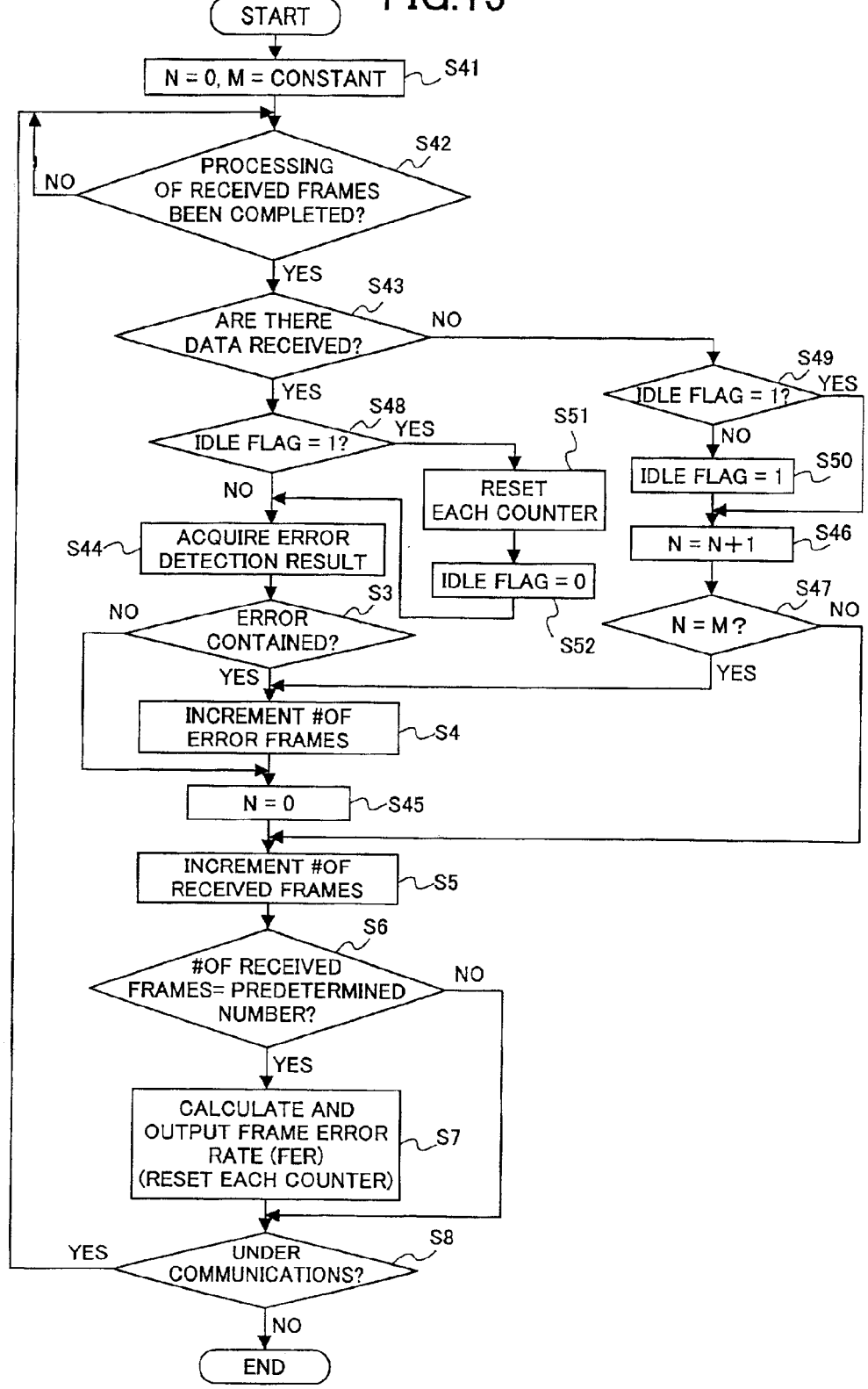
FIG. 15 illustrates a third example of operation flow of the error rate measuring unit shown in FIG. 4.

In order to obtain an accurate target SIR indicated by the solid line even immediately after the idle period, the error rate measuring unit 123 carries out the operation shown in FIG. 15.

FIG. 15 illustrates a third example of operation flow carried out by the error rate measuring unit 123. In this example, the error rate measuring unit 123 calculates an FER based on the actually received data beginning from time ts immediately after the idle period. The same numerical symbols denote the same steps as those shown in FIG. 11.

In operation, if it is in the idle period determined by the idle period detection signal after completion of signal processing of the received frame (YES in S42 and NO in S43), it is determined if an idle flag is set up (S49). If the idle flag is not set up (NO in S49), the idle flag is set up (S50).

Then, as long as the idle period continues, the error frame counter counts up at a ratio of a signal error frame to M time frames, while making confirmation of the idle flag being set up (S46, S47, S47 S45, and S5). Every time the number of time frames reaches a predetermined value, pseudo-FER is calculated and output (S7).

When the idle period terminates and the presence of received data is detected (YES in S43), then it is determined whether the idle flag is set up (S48). At this time (i.e., immediately after the idle period), the state of the idle flag set up at the beginning of the idle period (in S50) is still maintained, and therefore, the idle flag indicates a value "1" (YES in S48). In this case, the error frame counter and the received frame counter are reset (S51), and the idle flag is reset (S52).

During data transmission, every time the error rate measuring unit 123 receives an error detection result from the error correcting decoder/error detector 122 (S44), counter operation is conducted as in the previous example. If the error detection result indicates an error contained in the frame (YES in S3), the error frame counter and the received frame counter are incremented (S4 and S5). If the error detection result indicates no error (NO in S3), only the received frame counter is incremented (S5). If the number of received frames has reached a predetermined value (YES in S6), an FER is calculated based on the current number of error frames and the number of received frames, and the calculation result is output (S7).

In this example, the error frame counter and the received frame counter are reset every time data transmission resumes immediately after the idle period. Consequently, an accurate frame error rate reflecting only the actually received data is obtained, without taking the pseudo-FER into account at the beginning of resumed data transmission. This arrangement allows the target SIR to be determined more accurately even immediately after the idle period.

Next, an example in which the present invention is applied to multiple channels will be described.

Figure 16:
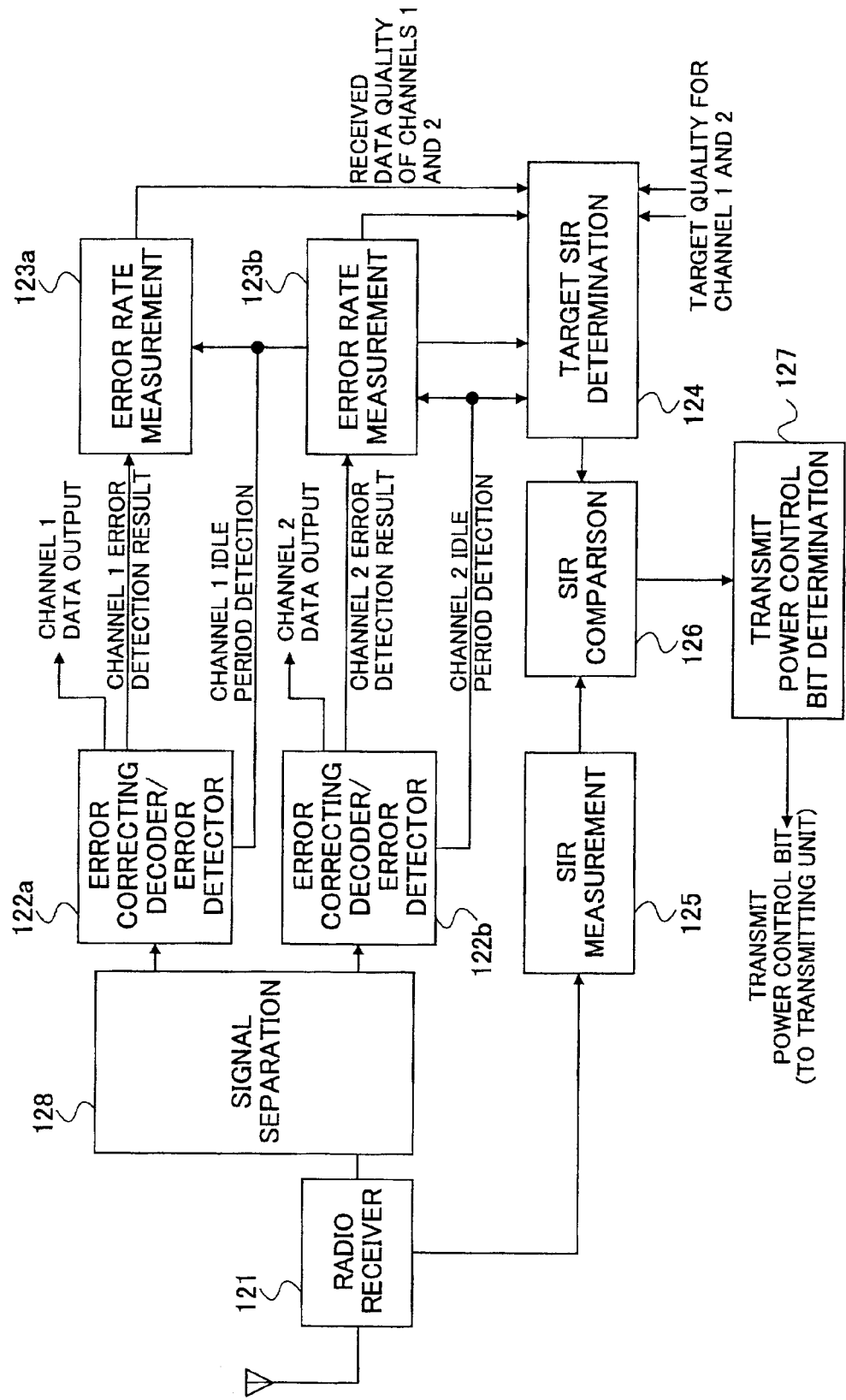
FIG. 16 illustrates a major part of the receiving unit taking multiple channels into account to carry out transmit power control.

FIG. 16 illustrates an example of the structure of the receiving unit 120 suitable to multi-channel communications. The radio receiver 121 receives a multiplexed signal of channel 1 (data channel, for example) and channel 2 (control channel, for example). Signal separation circuit 128 separates the signal components into channel 1 and channel 2. An error correcting decoder/error detector 122a and an error rate measuring unit 123a are provided for channel 1. Similarly, an error correcting decoder/error detector 122b and an error rate measuring unit 123b are provided for channel 2. The target SIR determination unit 124 receives data quality information (FER) about channel 1 and channel 2 from the error rate measuring units 123a and 123b, respectively. Based on the received data qualities of the respective channels, a target SIR is to be determined.

As in the example shown in FIG. 4, SIR comparator 126 compares the measured SIR obtained at SIR measuring unit 125 with the target SIR determined by the target SIR determination unit 124. Based on the comparison result, the transmit power control bit determination unit 127 determines a value of the transmit power control bit.

Figure 17:
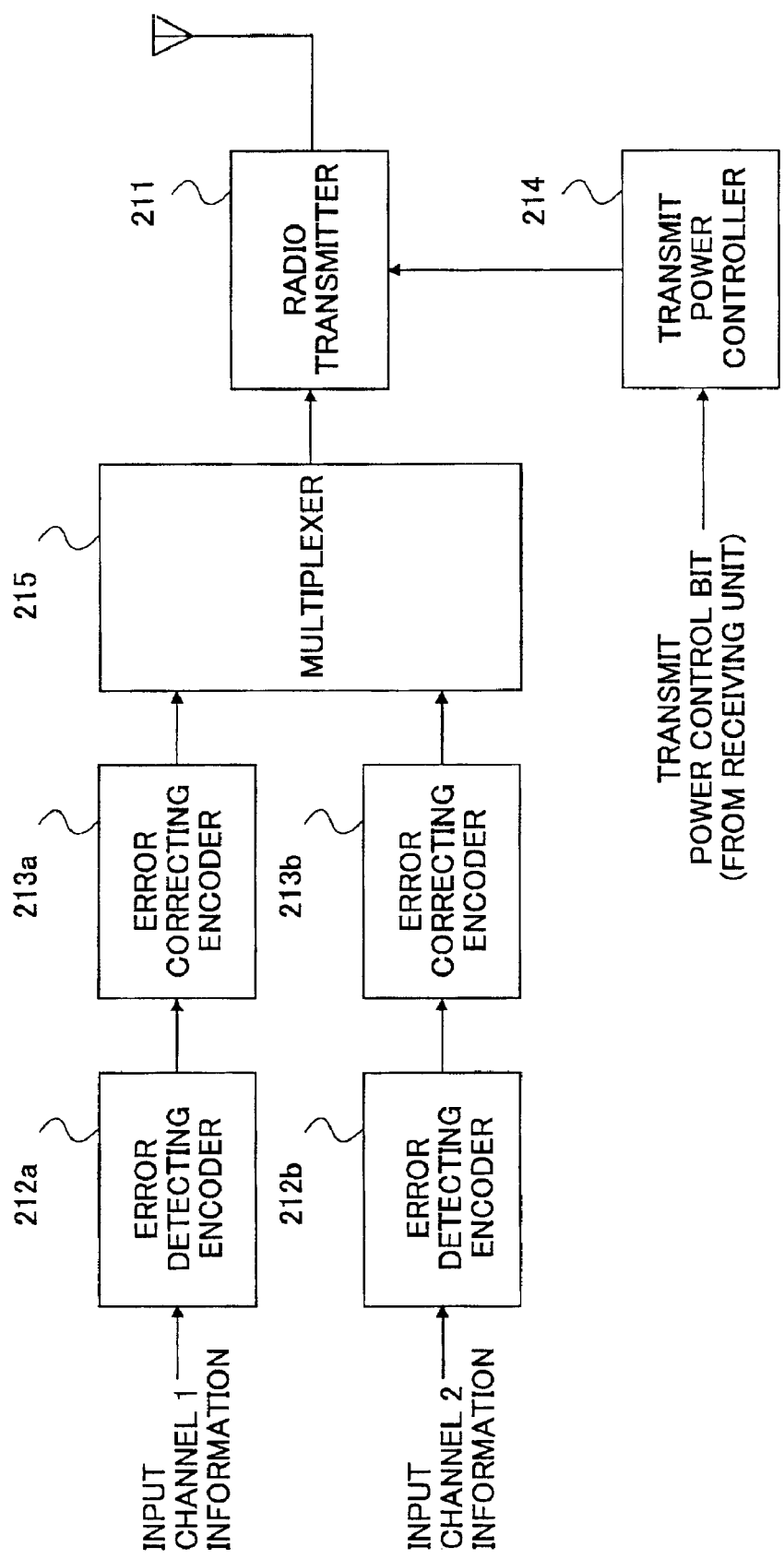
FIG. 17 illustrates a major part of the transmitting unit taking multiple channels into account to carry out transmit power control.

FIG. 17 illustrates an example of the structure of transmitting unit 210 that corresponds to the receiving unit 120 dealing with multi-channel communications. The transmitting unit 210 has an error detecting encoder 212a and an error correcting encoder 213a for channel 1, and has an error detecting encoder 212b and an error correcting encoder 213b for channel 2. The signals from the error correcting encoders 213a and 213b are multiplexed at the multiplexer 215, which is then supplied to the radio transmitter 211. The radio transmitter 211 modulates the multiplexed signal to transmit the signal to the mobile station 100. The transmit power controller 214 regulates the transmit power of the radio transmitter 211 based on the transmit power control bit received from the mobile station 100.

Figure 18:
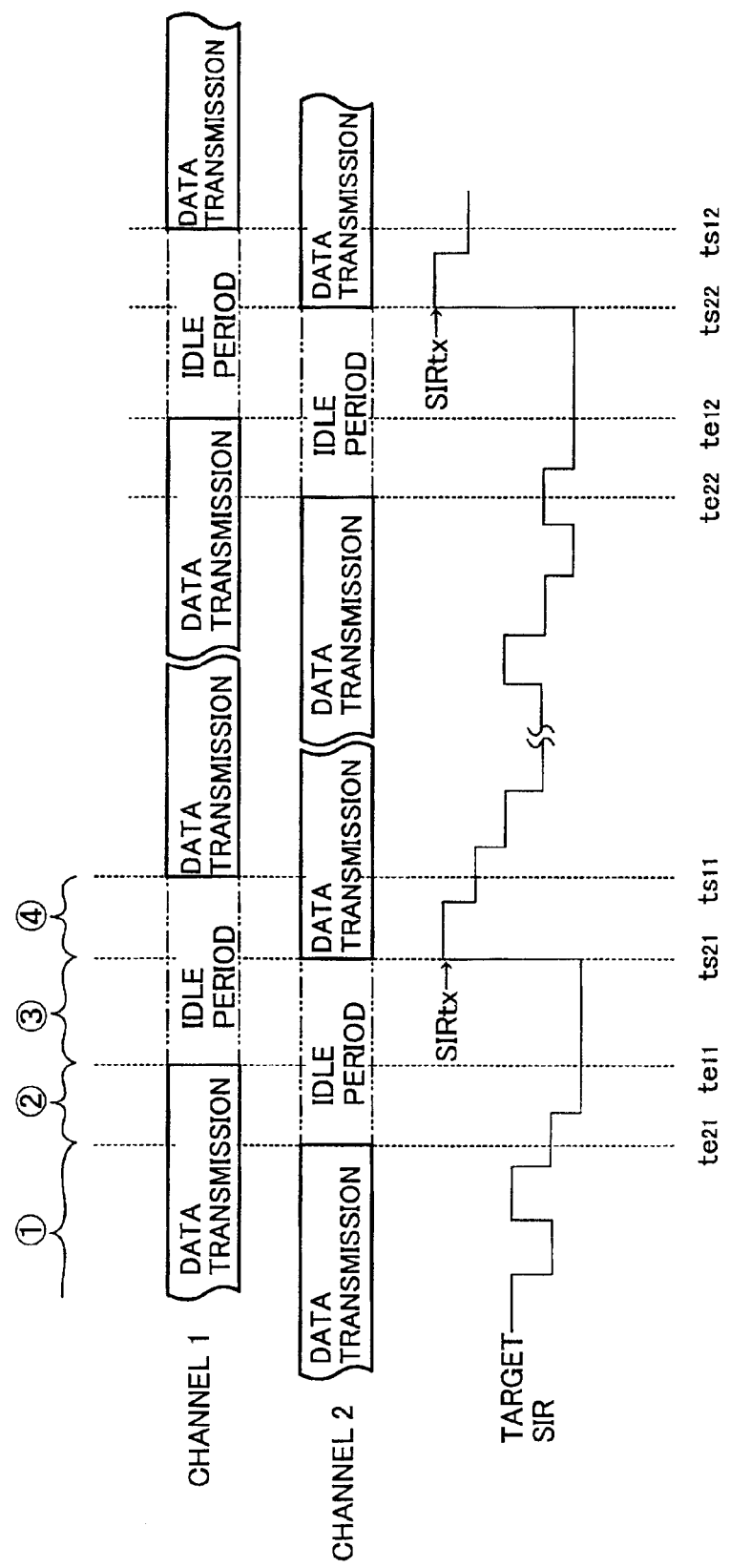
FIG. 18 illustrates a relation between the target SIR and data transmission conditions of multiple channels.

FIG. 18 illustrates an example of setting a target SIR in multi-channel communications. If there are two channels, data (or control signals) are transmitted discontinuously at each channel. There are several situations.

(1) Data being transmitted at both channels (Before te21, and between ts11 to te22)
(2) Data being transmitted only at channel 1 (te21 to te11, and te22 to te12)
(3) Data being transmitted at neither channel (te11 to ts21, and te12 to ts22)
(4) Data being transmitted only at channel 2 (ts21 to ts11, and ts22 to ts12)

In situation (1), the target SIR determination unit 124 determines a target SIR(1) for channel 1 based on the relative relation between the measured data quality (FER) received from the error rate measuring unit 123a and the target data quality for channel 1 (according to the operation flow shown in FIG. 12). Similarly, a target SIR(2) for channel 2 is determined based on the relative relation between the measured data quality (FER) obtained at the error rate measuring unit 123b and the target data quality for channel 2. Between target SIR(1) and target SIR(2), the larger one is selected as the final target SIR.

In situations (2) and (4) where data is transmitted via one of channel 1 and channel 2, a target SIR is determined based on the relative relation between the measured data quality (FER) received from either the error rate measuring unit 123a or 123b and the target data quality of that channel, according to the operation flow shown in FIG. 12.

Under situation (3) where both channels are in the idle period without data transmission, if data transmission resumes on either channel, the target SIR is set to SIRtx. Such SIRtx may be updated at or near the upper limit SIRto of the acceptable control range of the target SIR as shown in FIG. 6, or alternatively, it may be updated by adding a difference Δ corresponding to the length of the latest idle period to the previous target SIR as illustrated in FIGS. 8 through 13.

Setting the target SIRtx immediately after the idle period so as not to exceed the upper limit of the predetermined acceptable range of the target SIR can prevent unnecessarily high target SIR from being set. If an excessively high target SIR is set, it takes time to converge to the appropriate target SIR after data transmission resumes, resulting in data communications continuing at higher quality than required for a long time. Long over-quality communications at each use channel is undesirable for CDMA mobile communications systems because excessive transmit power is consumed at the transmitting station to allow over-quality communications, causing the system capacity to be reduced. By limiting the level of the target SIR updated immediately after the idle period, waste of transmit power can be avoided.

In the above-described examples, the transmitting station is, for example, a base station 200 of a mobile communications system, and the receiving station-corresponds to a mobile station.

Step 26 in FIG. 6 (setting target SIR to predetermined SIRto immediately after the idle period), step 35 in FIG. 8 (setting target SIR to SIRt+Δ(N) taking the length of the idle period into account), and step 20 in FIG. 12 (setting target SIR to SIRt+Δ1 or SIRt−Δ2 when using a pseudo-FER) are referred to as setting or adjusting a target signal quality.

In this manner, the target SIR is appropriately updated when data transmission resumes immediately after the idle period, which is relatively large as compared with the target SIR set at the beginning of the idle period. Consequently, data transmission resumes at a relatively high transmit power without causing deterioration of data quality even if the radio-wave propagation environment has changed between the transmitting station and the receiving station during the idle period.

Although the present invention has been described using specific examples, it is not limited to those examples, but includes many substitutions and modifications can be made without departing from the scope of the invention. For example, data quality information may not be limited to the current frame error rate (FER) calculated each time an error detection result is input. Instead, a moving average of FER obtained at a prescribed cycle may be used as data quality information.

In addition, the target SIR determination unit 124 may determine a target SIR based directly on the error detection result supplied from the error correcting decoder/error detector 122, instead of using an FER supplied from the error rate measuring unit 123. In this case, if the error detection result of each frame or every predetermined number of frames indicates the presence of error, the target SIR is increased by a predetermined quantity (1 dB, for example). If the error detection result indicates no error contained in successive frames, the target SIR may be decreased by a predetermined quantity (0.5 dB, for example).

This patent application is based on and claims the benefit of the earlier filing date of Japanese patent application No. 2001-199864 filed Jun. 29, 2001, the entire contents of which are hereby incorporated by reference.

What is claimed is:

1. A transmit power control method used in radio communications between a transmitting station and a receiving station, comprising the steps of:

updating target signal quality so that data quality received at the receiving station satisfies prescribed target data quality holding first target signal quality updated immediately before an idle period when data are transmitted discontinuously;

setting second target signal quality higher than the first target signal quality when data transmission resumes immediately after the idle period; and regulating transmit power of the transmitting station so that signal quality at the receiving station satisfies the second target signal quality when the data transmission resumes.

2. The method according to claim 1, further comprising the step of:

producing pseudo data quality lower than the prescribed target data quality during the idle period, wherein the target signal quality during the idle period is updated based on the pseudo data quality.

3. The method according to claim 2, wherein the second target signal quality is set without taking the latest pseudo-data quality into account when the data transmission resumes.

4. The method according to claim 1, wherein the second target signal quality is set so as not to exceed a predetermined upper limit.

5. The method according to claim 1, wherein discontinuous radio communications are carried out using multiple channels, and the second target signal quality is set when data transmission resumes on at least one of the channels under a situation where all the channels have been in the idle period.

6. The method according to claim 5, wherein the target signal quality is updated so that data quality of each channel satisfies corresponding target data quality assigned to that channel.

7. A transmit power control method used in radio communications between a transmitting station and a receiving station, comprising the steps of:

updating target signal quality so that data quality received at the receiving station satisfies prescribed target data quality holding first target signal quality updated immediately before an idle period when data are transmitted discontinuously;

setting second target signal quality higher than the first target signal quality when data transmission resumes immediately after the idle period; and regulating transmit power of the transmitting station so that signal quality at the receiving station satisfies the second target signal quality when the data transmission resumes, wherein the step of setting the second target signal quality includes adjusting the second target signal quality in response to a length of the idle period.

8. The method according to claim 7, wherein the second target signal quality is set by adding a differential quantity corresponding to the length of the idle period to the first target signal quality.

9. The method according to claim 7, further comprising the step of:
producing pseudo data quality lower than the prescribed target data quality during the idle period, wherein the target signal quality during the idle period is updated based on the pseudo data quality.

10. The method according to claim 9, wherein the second target signal quality is set without taking the latest pseudo-data quality into account when the data transmission resumes.

11. A transmit power control system used for radio communications between a transmitting station and a receiving station, comprising:
a target signal quality determination unit configured to update target signal quality so that data quality received at the receiving station satisfies prescribed target data quality, the target signal quality determination unit holding first target signal quality set immediately before an idle period when data are transmitted discontinuously and setting second target signal quality higher than the first target signal quality when data transmission resumes immediately after the idle period;
a control signal generator configured to generate a transmit power control signal based on the target signal quality; and
a transmit power controller configured to regulate transmit power of the transmitting station based on the control signal so that signal quality of the receiving station satisfies the target signal quality.

12. The system according to claim 11, further comprising:
a data quality determination unit configured to produce pseudo data quality lower than the prescribed target data quality during the idle period, wherein the target signal quality determination unit updates the target signal quality based on the pseudo data quality during the idle period.

13. The system according to claim 12, wherein the target signal quality determination unit sets the second target signal quality without taking the latest pseudo-data quality into account when the data transmission resumes.

14. The system according to claim 11, wherein the target signal quality determination unit sets the second target signal quality so as not to exceed a predetermined upper limit.

15. The system according to claim 11, wherein discontinuous radio communications are carried out using multiple channels, and the target signal quality determination unit sets the second target signal quality when the data transmission resumes on at least one of the channels under a situation where all the channels have been in the idle period.

16. The system according to claim 15, wherein the target signal quality determination unit updates the target signal quality so that data quality of each channel satisfies corresponding target data quality assigned to that channel.

17. A transmit power control system used for radio communications between a transmitting station and a receiving station, comprising:
a target signal quality determination unit configured to update target signal quality so that data quality received at the receiving station satisfies prescribed target data quality, the target signal quality determination unit holding first target signal quality set immediately before an idle period when data are transmitted discontinuously and setting second target signal quality higher than the first target signal quality when data transmission resumes immediately after the idle period;
a control signal generator configured to generate a transmit power control signal based on the target signal quality; and
a transmit power controller configured to regulate transmit power of the transmitting station based on the control signal so that signal quality of the receiving station satisfies the target signal quality, wherein the target signal quality determination unit sets the second target signal quality taking a length of the idle period into account.

18. The system according to claim 17, wherein the target signal quality determination unit sets the second target signal quality by adding a differential quantity corresponding to the length of the idle period to the first target signal quality.

19. The system according to claim 17, further comprising:
a data quality determination unit configured to produce pseudo data quality lower than the prescribed target data quality during the idle period, wherein the target signal quality determination unit sets the target signal quality based on the pseudo data quality during the idle period.

20. The system according to claim 19, wherein the target signal quality determination unit sets the second target signal quality without taking the latest pseudo-data quality into account when the data transmission resumes.

* * * * *